(12) United States Patent
Bailey et al.

(10) Patent No.: US 10,340,691 B2
(45) Date of Patent: Jul. 2, 2019

(54) RACK POWER DISTRIBUTION VIA MODULAR, EXPANDABLE BUS BAR FOR MODULAR AND SCALABLE/EXPANDABLE INFORMATION HANDLING SYSTEM

(71) Applicant: DELL, INC., Round Rock, TX (US)

(72) Inventors: Edmond Bailey, Cedar Park, TX (US); John R. Stuewe, Round Rock, TX (US); Paul W. Vancil, Austin, TX (US); Kunrong Wang, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 780 days.

(21) Appl. No.: 14/139,828

(22) Filed: Dec. 23, 2013

(65) Prior Publication Data

US 2015/0180234 A1 Jun. 25, 2015

(51) Int. Cl.
*H02J 3/00* (2006.01)
*H02J 1/10* (2006.01)
*G06F 1/26* (2006.01)

(52) U.S. Cl.
CPC .............. *H02J 1/10* (2013.01); *G06F 1/26* (2013.01); *Y10T 307/258* (2015.04)

(58) Field of Classification Search
USPC .......................................................... 307/12
See application file for complete search history.

(56) References Cited

U.S. PATENT DOCUMENTS

| | | | | |
|---|---|---|---|---|
| 2007/0046103 A1* | 3/2007 | Belady | ............... | H02G 3/00 307/12 |
| 2007/0188137 A1* | 8/2007 | Scheucher | ............... | H02J 1/10 320/116 |
| 2011/0136353 A1* | 6/2011 | Spitaels | ............... | H01R 25/003 439/95 |
| 2015/0177797 A1* | 6/2015 | Butzer | ............... | G06F 1/26 713/300 |

* cited by examiner

*Primary Examiner* — Rexford N Barnie
*Assistant Examiner* — Dru Parries
(74) *Attorney, Agent, or Firm* — Isidore PLLC

(57) ABSTRACT

A rack-based information handling system (IHS) includes a rack having a modular structure that supports insertion from a front of the rack of different numbers and sizes of information technology (IT) gear to create one or more IT nodes. Power bay chassis is received in the rack with a power distribution unit directed towards a rear of the rack. A modular busbar assembly is attached to the rear of the rack. A first vertical busbar segment is in direct electrical connection with the power distribution unit and spans one or more nodes to provide hot pluggable electrical power to an aft-directed connection of an IT node inserted into the rack. A second busbar segment can be attached to the first vertical busbar to electrically communicate with the power distribution unit and span an additional node adjacent to the one or more nodes to provide electrical power to the adjacent node.

26 Claims, 19 Drawing Sheets

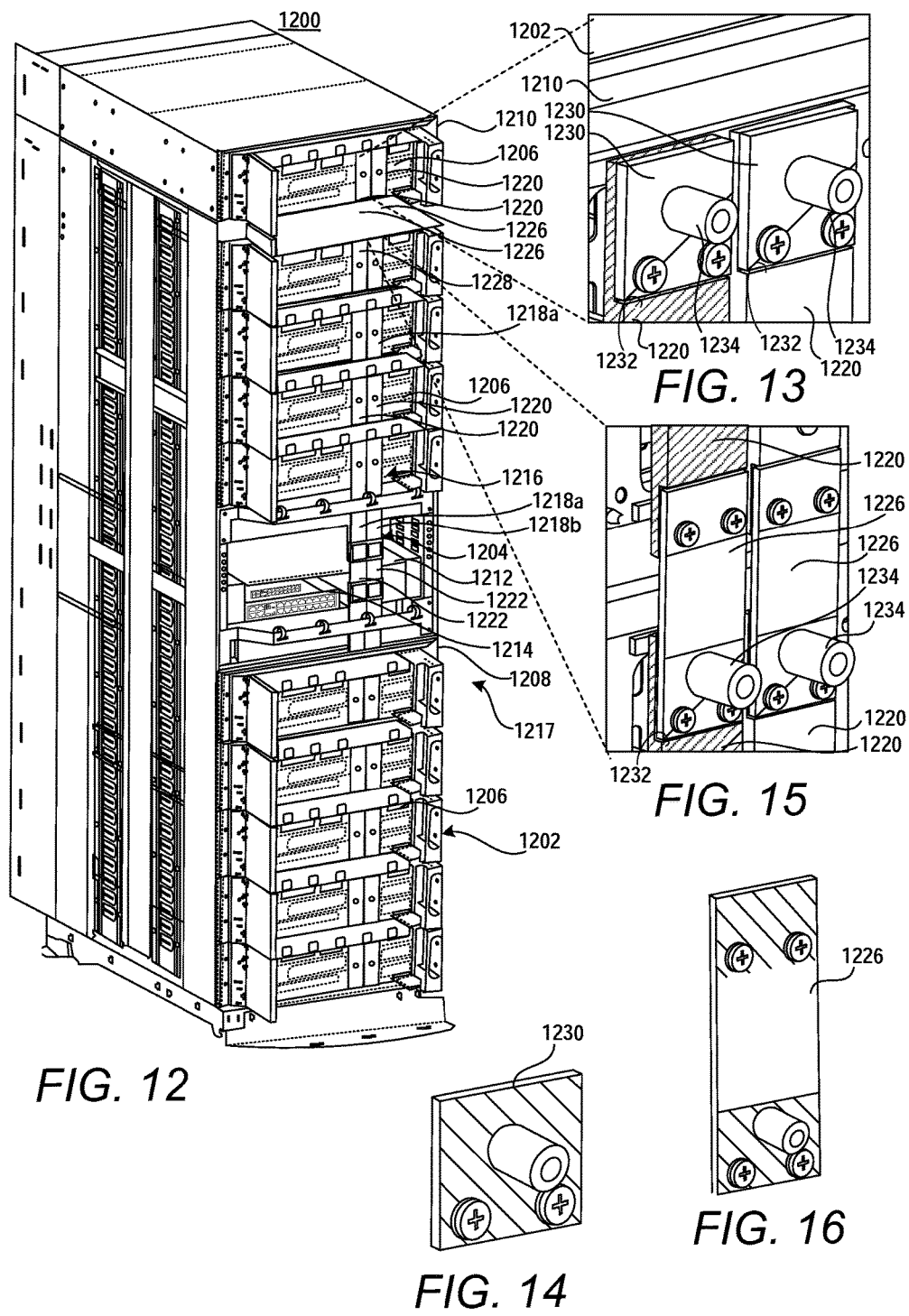

RACK POWER DISTRIBUTION VIA MODULAR, EXPANDABLE BUS BAR FOR MODULAR AND SCALABLE/EXPANDABLE INFORMATION HANDLING SYSTEM

BACKGROUND

1. Technical Field

The present disclosure generally relates to an information handling system and in particular to a modular busbar for a modular, scalable, and expandable rack-based information handling system and design.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Large scale information handling systems, as utilized within data centers, are often designed in a rack configuration, having one or more servers and/or banks of storage physically located within a single rack chassis. The number of servers and thus the computing power that can be placed in these rack chassis can vary. However, each of the individual units that are inserted into the rack require a supply of power, whether AC or DC supply. In conventional rack systems, each unit is provided power via a separate power cable that is run at either the back or the front of the rack into the power receptacle of the unit being powered. This conventional methodology of supplying power results in a large number of power cables and does not accommodate scalability within a modular design of a rack-based IHS.

BRIEF SUMMARY

Disclosed are a rack-based information handling system (IHS) and a method for providing modularly expandable power supply to a modular, scalable and expandable, rack-based IHS. The racked-based IHS includes a rack having a modular structure that supports insertion from a front of the rack chassis of different numbers and sizes of information technology (IT) gear to create one or more IT nodes. A power bay chassis that is received in the rack has a power distribution unit directed toward a rear of the rack. A modular busbar assembly is attached to the rear of the rack. The modular busbar assembly includes a first vertical busbar segment in direct electrical connection with the power distribution unit and spans one or more nodes to provide hot pluggable electrical power to an aft-directed connection of an IT node inserted into the rack. In one embodiment, the modular busbar assembly can include at least one second busbar segment attached to the first vertical busbar to electrically connect with the power distribution unit. The at least one second busbar segment spans vertically across a rear sectional of one or more additional nodes that are adjacent to the one or more nodes, and the at least one second busbar segment provides electrical power to these additional nodes.

According to at least one aspect of the present disclosure, a method is provided for assembling a rack-based IHS. The method includes assembling a rack having a modular structure that supports insertion from a front of the rack of different numbers and sizes of IT gear to create one or more IT nodes. The method includes inserting a power bay chassis in the rack to present a power distribution unit directed toward a rear of the rack. The method includes attaching a modular busbar assembly to the rear of the rack by: attaching a first vertical busbar segment in direct electrical connection with the power distribution unit to span one or more nodes for providing hot pluggable electrical power to an aft-directed connection of an IT node inserted into the rack. In one embodiment, the method further includes attaching a second busbar segment to the first vertical busbar for indirect electrical connection with the power distribution unit and to span an additional node adjacent to the one or more nodes for providing electrical power.

According to at least one aspect of the present disclosure, a rack-based IHS includes a rack assembly having a modular structure that supports insertion from a front of the rack of different numbers and sizes of IT gear to create one or more IT nodes. A power bay chassis is inserted into the rack assembly and comprises a power distribution unit directed toward a rear of the rack. A first modular busbar assembly is attached to the rear of the rack and includes a power busbar assembly and a ground busbar assembly. Each of the power and ground busbar assemblies in turn include one or more block busbars lengthwise attached to span a corresponding one or more IT nodes inserted into the rack assembly into electrical. A connecting busbar is attached between the power distribution unit and the one or more block busbars to provide electrical power to the one or more IT nodes.

According to at least one aspect of the present disclosure, a method is provided for assembling a modular busbar assembly for a rack-based IHS; assembling a rack assembly having a modular structure that supports insertion from a front of the rack of different numbers and sizes of IT gear to create one or more IT nodes; providing a power bay chassis that is received in the rack assembly and comprises a power distribution unit directed toward a rear of the rack; and attaching a first modular busbar assembly to the rear of the rack, the first modular busbar assembly comprising a power busbar assembly and a ground busbar assembly. Each of the power and ground busbar assemblies include one or more block busbars lengthwise attached to span a corresponding one or more IT nodes inserted into the rack assembly into electrical connection with the first modular busbar assembly; and a connecting busbar attached between the power distribution unit and the one or more block busbars to provide electrical power to the one or more IT nodes.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 12 illustrates a rear isometric view of a rack-based IHS having a sectional busbar assembly that is expandable, modular and scalable for each IT node that is inserted into the rack assembly, according to one embodiment;

FIG. 13 illustrates a detail isometric view top block bus bar of the first modular busbar assembly attached to a top notched portion of each of block busbar, according to one embodiment;

FIG. 14 illustrates an isometric view of a top block busbar that is not installed, according to one embodiment;

FIG. 15 illustrates a detail isometric view of a top-of-rack (TOR) connecting bar attached between block bars of a first frame assembly and block bars of a second frame assembly, according to one embodiment;

FIG. 16 illustrates an isometric view of a TOR connecting busbar that is not installed, according to one embodiment;

DETAILED DESCRIPTION

Figure 1:
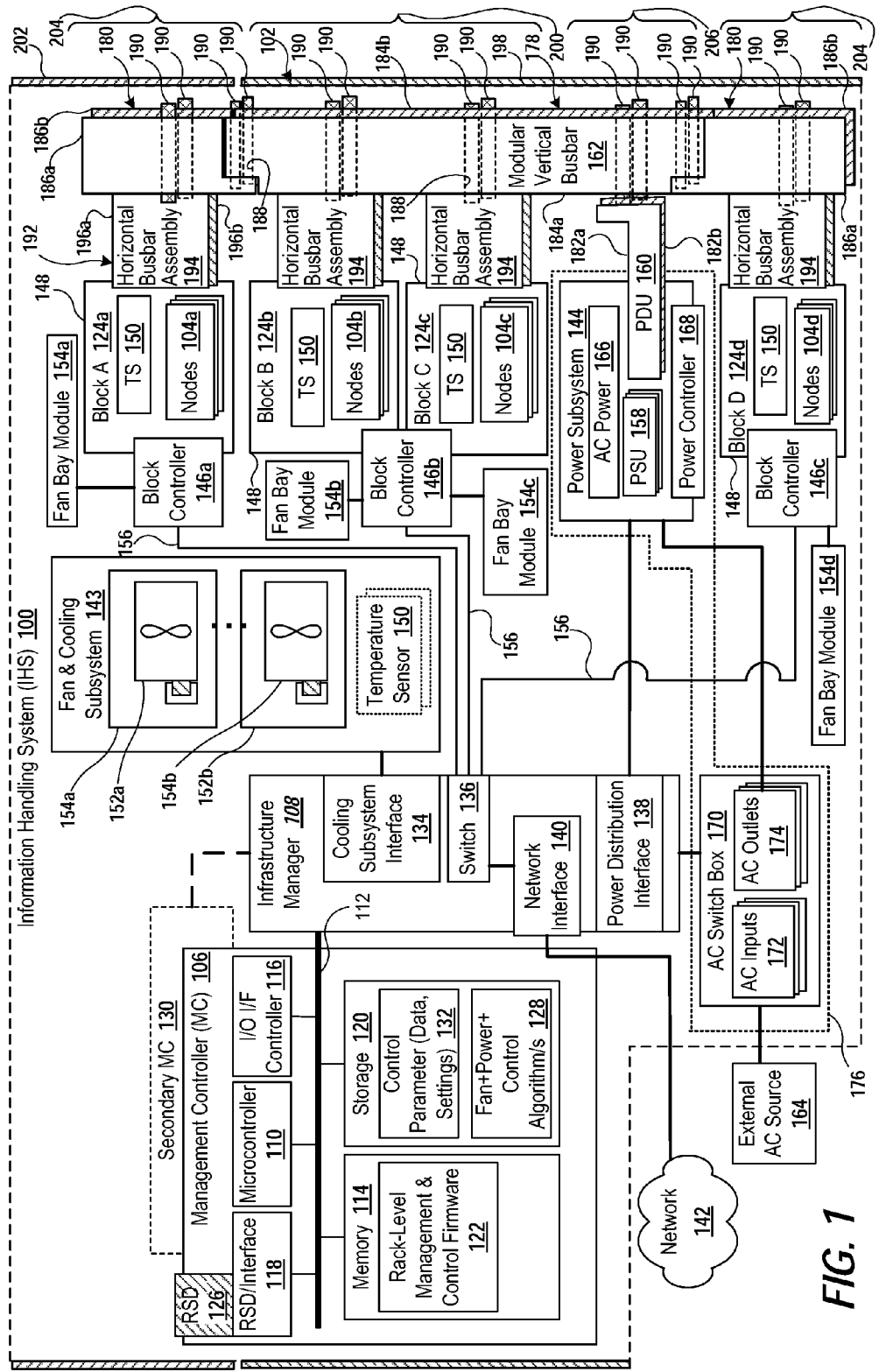
FIG. 1 illustrates a block diagram of an example information handling system (IHS) within which various aspects of the disclosure can be implemented, according to one or more embodiments.

The present innovation provides a modular busbar created with segments that can be added or removed along the rear of a modular rack of an Information Handling System (IHS). Each segment of the busbar may be assembled as necessary to support the required Information Technology (IT) equipment positioned next to the busbar segment within the rack configuration. In one implementation, the rack is divided into blocks and a separate busbar sectional/segment is provided for each block being powered. One design provides a main segment of specific length that connects to a power bay of the rack, and with options to add additional segments for IT equipment added to the top and bottom of the rack extending beyond the main busbar. A horizontal busbar assembly is provided at the back of each block chassis or sled with a pin or sleeve to couple to the vertical busbar as the chassis or block is slid into place from the front of the rack. This innovation may support hot pluggable connections to power the IT components within the block without having to go to the back side of the rack and connect power cables.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a two-dimensional block diagram representation of an example rack-based information handling system (IHS) 100, within which one or more of the described features of the various embodiments of the disclosure can be implemented to support hot swapping of storage devices for a modular, scalable/expandable IHS. As a two-dimensional image, certain of the presented components are shown in different orientations relative to each other for simplicity in describing the connectively of the components. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As presented in FIG. 1, IHS 100 includes a rack 102, which can comprise one or more panels of sheet metal or other material interconnected to form a three dimensional volume generally referred to in the industry as a rack. Unique aspects of the rack 102, which add to the modularity and expandability of IHS 100, are further illustrated and described in one or more of the three-dimensional figures presented herein. As is further presented by these three-dimensional figures, certain components indicated herein are located internal to the rack 102 while other components can be located external to rack 102. These various components are communicatively connected to one or more components via power and communication cables, which are generally represented by the connecting lines of FIG. 1.

IHS 100 comprises a hierarchical arrangement of multiple management modules, along with power and cooling components, and functional processing components or IT components within end nodes. At the rack level, IHS 100 includes a management controller (MC) 106 communicatively connected to infrastructure manager/module (IM) 108. MC 106 can also be referred to as a Rack Management Controller (RMC). MC 106 includes a microcontroller 110 (also generally referred to as a processor) which is coupled via an internal bus 112 to memory 114, I/O interface controller 116, removable storage device (RSD) interface 118 and storage 120. Memory 114 can be flash or other form of memory. Illustrated within memory 114 is rack-level power management and control (RPMC or PMC) firmware 122, which is inclusive of the firmware that controls the operation of MC 106 in communicating with and managing the down-stream components (i.e., blocks 124 and computing nodes 104, etc.) of IHS 100. I/O interface 116 provides connection points and hardware and firmware components that allow for user interfacing with the MC 106 via one or more connected I/O devices, such as a keyboard, a mouse, and a monitor. I/O interface 116 enables a user to enter commands via, for example, a command line interface (CLI), and to view status information of IHS 100.

I/O interface 116 also enables the setting of operating parameters for IHS 100, among other supported user inputs. RSD interface 118 enables insertion or connection of a RSD 126, such as a storage device (SD) card containing pre-programmable operating firmware for IHS 100. In at least one embodiment, a RSD 126 stores a copy of the operating parameters of IHS 100 and the RSD 126 can be utilized to reboot the IHS 100 to its operating state following a system failure or maintenance shutdown. Storage 120 can be any form of persistent storage and can include different types of data and operating parameters (settings) 132 utilized for functional operation of IHS 100. Among the stored content within storage 120 may also be algorithms 128 for fan and/or power and/or control. For example, the algorithms 128 can facilitate hot swapping of blocks 124 or nodes 104. In one or more embodiments, IHS 100 can optionally include at least one other MC, illustrated as secondary MC 130, to provide a redundant configuration of MCs 106/130 which are both simultaneously active and functioning. With these embodiments, the redundant configuration enables IHS 100 to continue operating following a failure of either of the MCs 106/130 or in the event one of the MCs 106/130 has to be taken offline for maintenance.

Infrastructure manager 108 includes cooling subsystem interface 134, Ethernet switch 136, power distribution interface 138 and network interface 140. Network interface 140 enables IHS 100 and specifically the components within IHS 100 to connect to communicate with or via an external network 142.

In addition to the above described MC 106 and IM 108, IHS 100 further comprises a fan and cooling subsystem 143, power subsystem 144, and a plurality of processing blocks 124, individually labeled as blocks A-D 124a-124d. In one implementation, each block 124 has an associated block controller (BC) 146. Each block 124 may be enclosed within a block chassis 148 that is inserted to the rack 102 with connectors and conductors aligned for automatic engagement.

Cooling subsystem 143 includes a plurality of fan modules, or merely "fans", of which a first fan 152a and a second fan 152b are shown. These fans 152a, 152b are located within a respective fan bay module 154 and can be different sizes and provide different numbers of fans 152 per fan bay module 154. Also included within cooling subsystem 143 is a plurality of temperature sensors 150, which are further shown distributed within or associated with specific blocks 124. Cooling subsystem 143 of IHS 100 further includes some design features of the rack 102, such as perforations for air flow and other design features not expanded upon within the present description. Each fan bay module 154a-154b is located behind (or in the air flow path of) a specific block 124 and the fan 152a-152b is communicatively coupled to and controlled by the block controller 146 associated with that block 124. Within each block 124 is at least one, and likely a plurality, of functional/processing nodes (computing nodes 104). As one aspect of the disclosure, the number of computing nodes 104 that can be placed within each block and/or supported by a single block controller 146 can vary up to a maximum number (e.g., 16) based on the block dimension relative to the size and configuration of each computing nodes 104. Also, as shown with blocks B 124b and C 124c, a single block controller 146b can be assigned to control multiple blocks 124b-124c, when the number of computing nodes 104 within an individual block does not exceed the pre-established block controller (BC) threshold. In at least one implementation, the BC threshold can be set to 16 nodes. Each computing node 104 controlled by a respective block controller 146 is communicatively coupled to block controller 146 via one or more cables.

Ethernet switch 136 enables MC 106 to communicate with block controllers 146 via a network of Ethernet cables 156. Specifically, according to at least one embodiment, MC 106 provides certain control and/or management signals to BCs 146 via one or more select wires within the Ethernet cables 156, which select wires are additional wires within the Ethernet cable 156 that are not utilized for general system and network communication.

Power subsystem 144 generally includes a plurality of power supply units (PSUs) 158, one or more power distribution units (PDUs) 160, and a modular busbar assembly 162. Power subsystem 144 also includes a source of external AC source 164 connected to an internal AC power 166. Each of the individual computing nodes 104 and other components within the IHS 100 that require power are either directly coupled to modular busbar assembly 162 or coupled via power cables to PDUs 160 to obtain power. As one aspect of power distribution within IHS 100, MC 106 can monitor power consumption across the IHS 100 as well as the amount of available power provided by the functional PSUs 158 and trigger changes in power consumption at the block level and ultimately at the (processing) node level based on changes in the amount of available power and other factors. Control of the power subsystem 144 can, in one embodiment, be provided by a separate power controller 168, separate from MC 106. As further illustrated, one additional aspect of the power subsystem 144 for the IHS 100 is the inclusion of AC switch box 170. AC switch box 170 is communicatively coupled to both IM 108 and power subsystem 144. AC switch box 170 includes a plurality of AC inputs 172 and a plurality of AC outlets 174 that are utilized to supply power to the PSUs 158, and other functional components of the IHS 100 that require AC power.

In one embodiment, the rack-based IHS 100 includes the rack 102 having a modular structure that supports insertion from a front of the rack of different numbers and sizes of IT gear to create one or more IT nodes 104. A power bay chassis 176 is received in the rack 102 and includes a PDU 160, which is directed toward a rear of the rack 102. A modular busbar assembly 162 is attached to the rear of the rack and includes a first vertical busbar segment 178 that is in direct electrical connection with the PDU 160 and spans one or more nodes 104 to provide electrical power. For example, first vertical busbar segment 178 spans block B 124b and block C 124c. A second vertical busbar segment 180 is attachable to the first vertical busbar segment 178 to electrically connect with the PDU 160. Second vertical busbar segment 180 spans at least one additional node 104 adjacent to the one or more nodes 104 to provide electrical power. For example, the second vertical busbar segment 180 may be above the first vertical busbar segment 178 to provide power to block A 124a. Alternatively, another second vertical busbar segment 180 may be below the first vertical busbar segment 178 to provide power to block D 124d.

In one or more embodiments, the PDU 160 of the power bay chassis 176 includes a positive distribution conductor 182a and a negative distribution conductor 182b. In correspondence, the first vertical busbar segment 178 includes a first positive vertical busbar conductor 184a in direct electrical connection with the positive distribution conductor 182a and a first negative vertical busbar conductor 184b in direct electrical connection with the negative distribution conductor 182b. Similarly, the second vertical busbar segment 180 includes a second positive vertical busbar conductor 186a in direct electrical connection with the first positive vertical busbar conductor 184a and a second negative busbar conductor 186b in direct electrical connection with the first negative vertical busbar conductor 184b. In an exemplary embodiment, one of the first and second vertical busbar segments 178, 180 include one or more holes 188 and another of the first and second vertical busbar segments 178, 180 includes corresponding one or more pins 190 that are to be inserted into the one or more holes to form an electrically conductive attachment.

In one embodiment, the block chassis 148 includes an aft-facing busbar connector 192 aligned to contact, physically attach, and electrically communicate with one of the first and second vertical busbar segments 178, 180 when the block chassis 148 is horizontally inserted into the rack 102 from the front. For example, the aft-facing busbar connector 192 may include a horizontal busbar assembly 194 as an attachment component with aft-facing pins 190 that are received within holes 188 formed in the first and/or second vertical busbar segments 178, 180. Each horizontal busbar assembly 194 may include a positive horizontal conductor 196a and a negative horizontal conductor 196b. The horizontal busbar assembly 194 may electrically communicate with each full width block (i.e., a block containing full-width IT components) or each of more than one partial-width or fractional-width configuration, such as one-third width blocks (containing three side-by-side one-third width IT components) and half-width blocks (containing two side-by-side half width IT components).

In one embodiment, the rack 102 includes a first frame assembly 198 having a first number of IT nodes 104 in a standard zone 200 of the rack 102 spanned by the first vertical busbar segment 178. For example, the first vertical busbar segment 178 may supply block B 124*b* and block C 124*c* that are in the standard zone 200 of the first frame assembly 198. A second frame assembly 202 is mountable on the first frame assembly 198 and has a second number of IT nodes 104 in an expansion zone 204 spanned at least in part by the second vertical busbar segment 180. For example, the second vertical busbar segment 180 may supply block A 124*a* that is in the expansion zone 204 of the second frame assembly 202. Block D 124*d* may be in another expansion zone 204 that is supplied by another second vertical busbar segment 180. The second frame assembly 202 may provide an expansion to the first frame assembly 198 or provide a method of reducing the overall height of the rack 102 during deployment.

In one embodiment, the power bay chassis 176 is installed within a switch zone 206 of the rack 102 of the first frame assembly 198 that is below the standard zone 200. Alternatively, the power bay chassis 176 may be in the second frame assembly 202. The power bay chassis 176 may enclose one or more AC switches, such as the AC switch box 170 having AC inputs 172 and AC outlets 174 that are connected to the external AC source 164. The power bay chassis 176 may further contain PSUs 158 that are electrically connected to the AC switch box 170 to receive internal AC power 166. The PDU 160 is electrically connected to the one or more PSUs 158 to receive direct current (DC) electrical power.

For purposes of the disclosure all general references to an information handling system shall refer to the rack-level IHS 100, while references to actual computing nodes 104 within the IHS 100 shall be referenced as chassis level computing nodes 104 or IT components. It is further appreciated that within the rack-level IHS 100 can be implemented separate domains or systems that are independent of each other and can be assigned to different independent customers and/or users. However, this level of detail of the actual use of the computing nodes 104 within the general rack-level IHS 100 is not relevant to the descriptions provided herein and are specifically omitted. For clarity, a single rack-level IHS 100 is illustrated. However, an IHS may include multiple racks. For example, one rack may contain only storage sleds with other racks providing computing nodes. In an exemplary embodiment, components of the IHS 100 are organized into a hierarchy as described in TABLE A:

Further, those of ordinary skill in the art will appreciate that the hardware components and basic configuration depicted in the various figures and described herein may vary. For example, the illustrative components within IHS 100 are not intended to be exhaustive, but rather are representative to highlight components that can be utilized to implement various aspects of the present disclosure. For example, other devices/components/modules may be used in addition to or in place of the hardware and software modules depicted. The depicted examples do not convey or imply any architectural or other limitations with respect to the presently described embodiments and/or the general disclosure.

Figure 2:
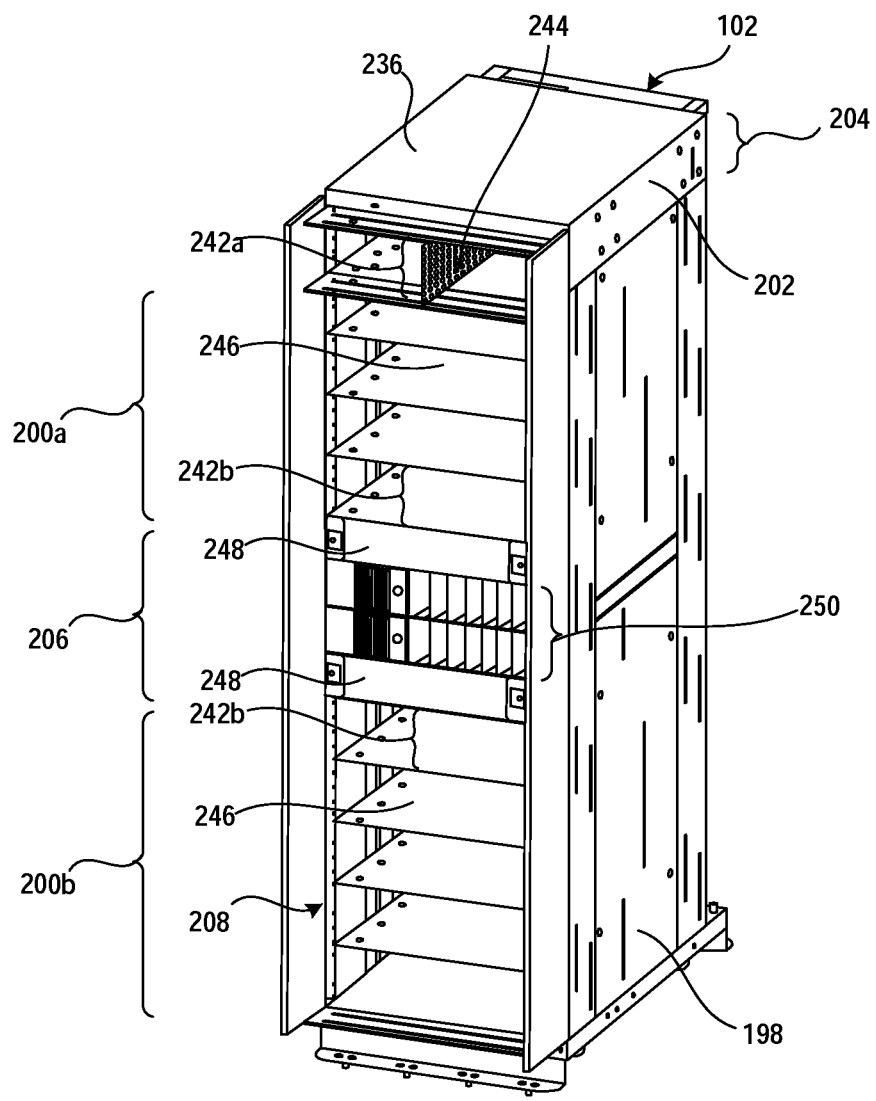
FIG. 2 illustrates a front isometric view of an example rack prior to insertion of functional components for the rack to operate as an IHS, according to one or more embodiments.

FIG. 2 illustrates a front isometric view 208 of an example rack 102 that is ready to receive functional components within a first frame assembly 198 that includes an upper standard zone 200*a* and a lower standard zone 200*b* on either side of a switch zone 206. The rack 102 also includes the second frame assembly 202 attached on top of the first frame assembly 198 and includes an expansion zone 204. In an illustrative configuration, the second frame assembly 202 is divided vertically by a partition 244 into two half-width IT bays 242*a*. The upper standard zone 200*a* of the first frame assembly 198 may be configured as a 20 GU server zone divided horizontally into four tiers by shelves 246. Each shelf 246 may be provide full-width IT bays 242*b* or include partitions for partial-width bays. The switch zone 206 of the rack 102 includes a switch bay 248 (2 U), two power bays 250 (3 GU×2), and another switch bay 248 (2 U). The lower standard zone 200*b* may be configured as a 25 GU server zone divided into five tiers by shelves 246 into full-width IT bays 242*b*.

Figure 3:
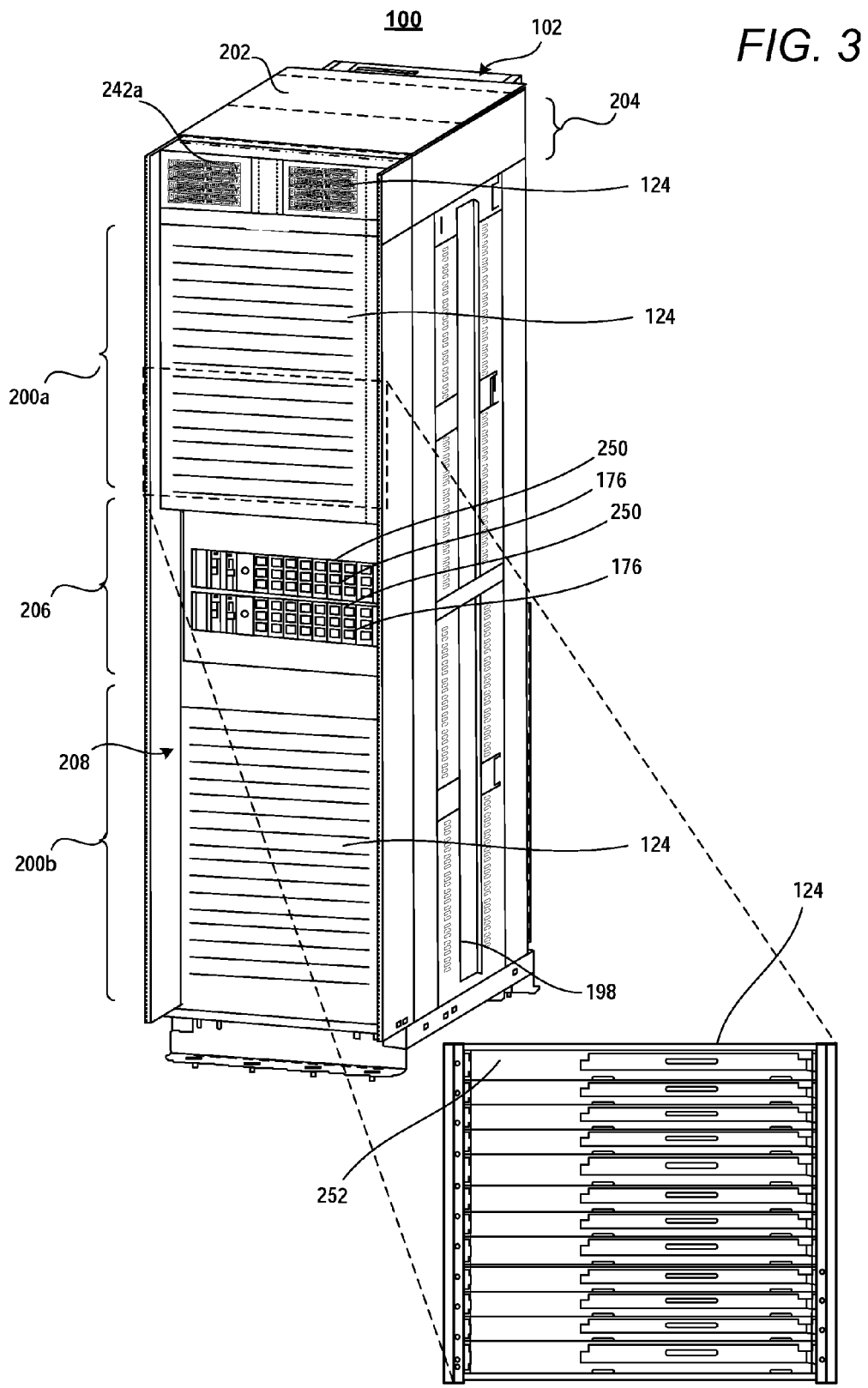
FIG. 3 illustrates a front isometric view of the example rack of FIG. 2 after insertion of functional components for the rack to operate as an IHS, according to one embodiment.

FIG. 3 illustrates the example rack 102 having functional components inserted therein to operate as a rack-based IHS 100. In an illustrative configuration, the half-width IT bays 242*a* of the expansion zone 204 of the second frame assembly 202 have received 1×5 GU blocks 124. Similarly, the full-width IT bays 242*a* of the upper standard zone 204 of the first frame assembly 198 contains 4×5 GU blocks 124 including storage sleds 252. Then, the switch zone 206 includes power bay chasses 176. The lower standard zone 200*b* is configured as a 25 GU server zone that has received 5×5 GU blocks 124.

Figure 4:
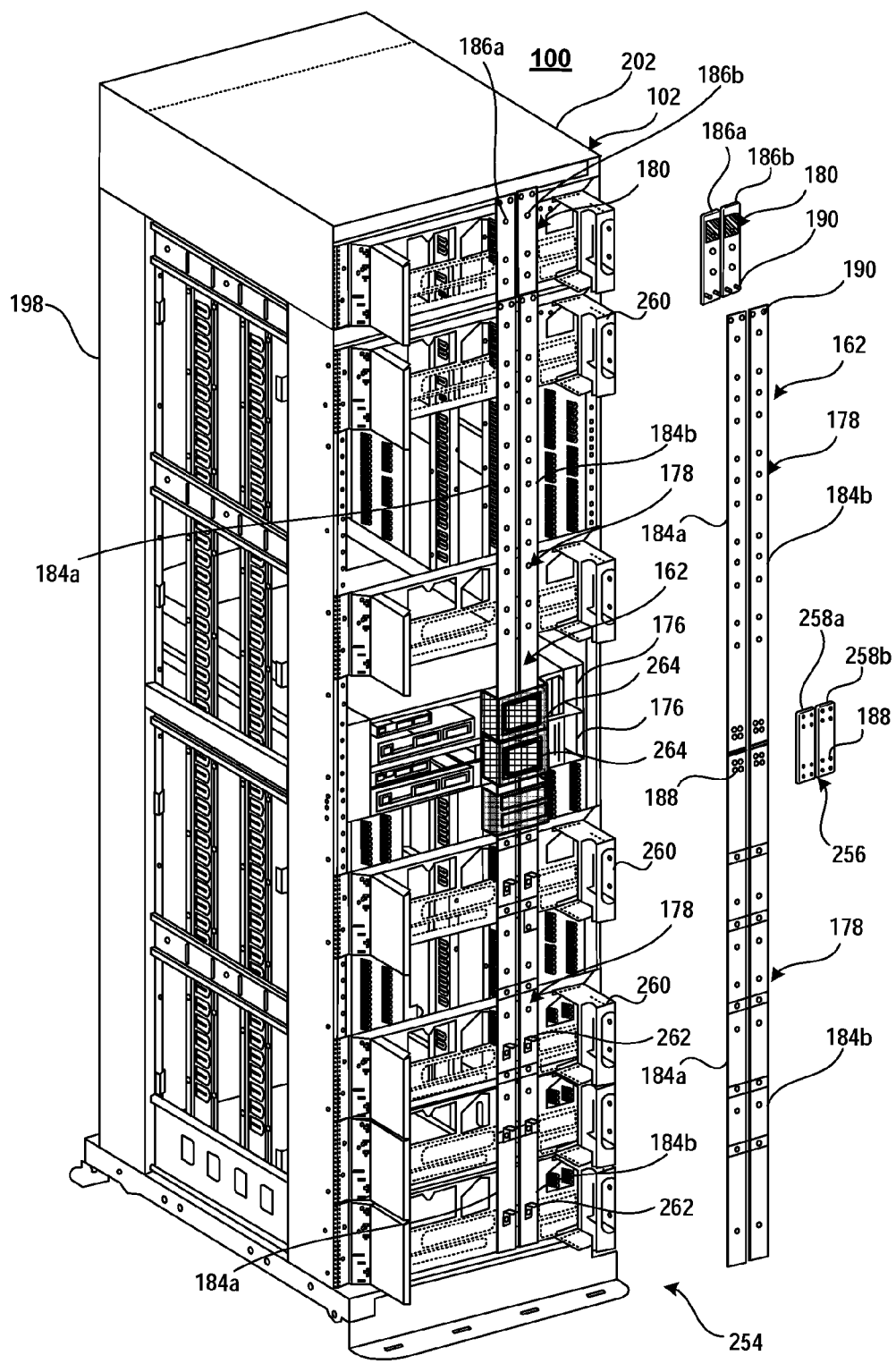
FIG. 4 illustrates a rear view of a rack-based IHS having a modular busbar assembly in an exploded view and as installed, according to one embodiment.

FIG. 4 illustrates a rear side view 254 of the rack 102 having a modular busbar assembly 162 as installed, as well as illustrating the modular busbar assembly 162 in an exploded view. The rack 102 also includes the second frame assembly 202 attached on top of the first frame assembly 198. The example rack-based IHS 100 includes an upper and lower power bay chasses 176 with each having correspond-

TABLE A

| Level | Device/Module | Acronym | Comments |
|---|---|---|---|
| Domain Level | Management Controller | MC | In front of Power Bay |
| Domain Level | Infrastructure module | IM | In rear of Power Bay |
| Domain Level | AC Switch Box | ACSB | Behind network switches |
| Domain Level | Power Bay Power Module | PBPM | Connects to 10 supplies and two MCs. Designed by Delta |
| Domain Level | Power Bay | Power Bay | Holds PBPM, MCx2, IM, & ACSB |
| Block Level | Block Controller | BC | Hot plug Fan controller + Serial & node interface |
| Block Level | Block Controller Distribution Board (BCDB) | BCDB | Fixed in Block |
| Block Level | Power Interface Board | PIB | Columns of 4 nodes |
| Block Level | Temperature Probe Board | TPB | Ambient Temperature Sensor |
| Node Level | Node Power Distribution Board | NPDB | In each node |
| Node Level | 4 drive HDD BP | x4HDDBP | Used in 12 drive FW HP sled |
| Node level | 2 drive HDD PB | x2HDDBP | Used for HP 2.5" in HW sled | ing first vertical busbar segment 178. In the illustrative configuration, the upper first vertical busbar segment 178 extends upwardly from the upper power bay chassis 176 and the lower first vertical busbar segment 178 extends downwardly from the lower power bay chassis 176. The upper and lower first vertical busbar segment 178 further include respectively a first positive vertical busbar conductor 184a and a first negative vertical busbar conductor 184b. A middle vertical busbar segment 256 includes a positive middle conductor 258a and a negative middle conductor 258b that tie the upper and lower vertical busbar segments 178 together. The upper vertical busbar segment 178 is connected to the second vertical busbar segment 180 and includes a second positive vertical busbar conductor 186a and a second negative busbar conductor 186b.

Figure 5:
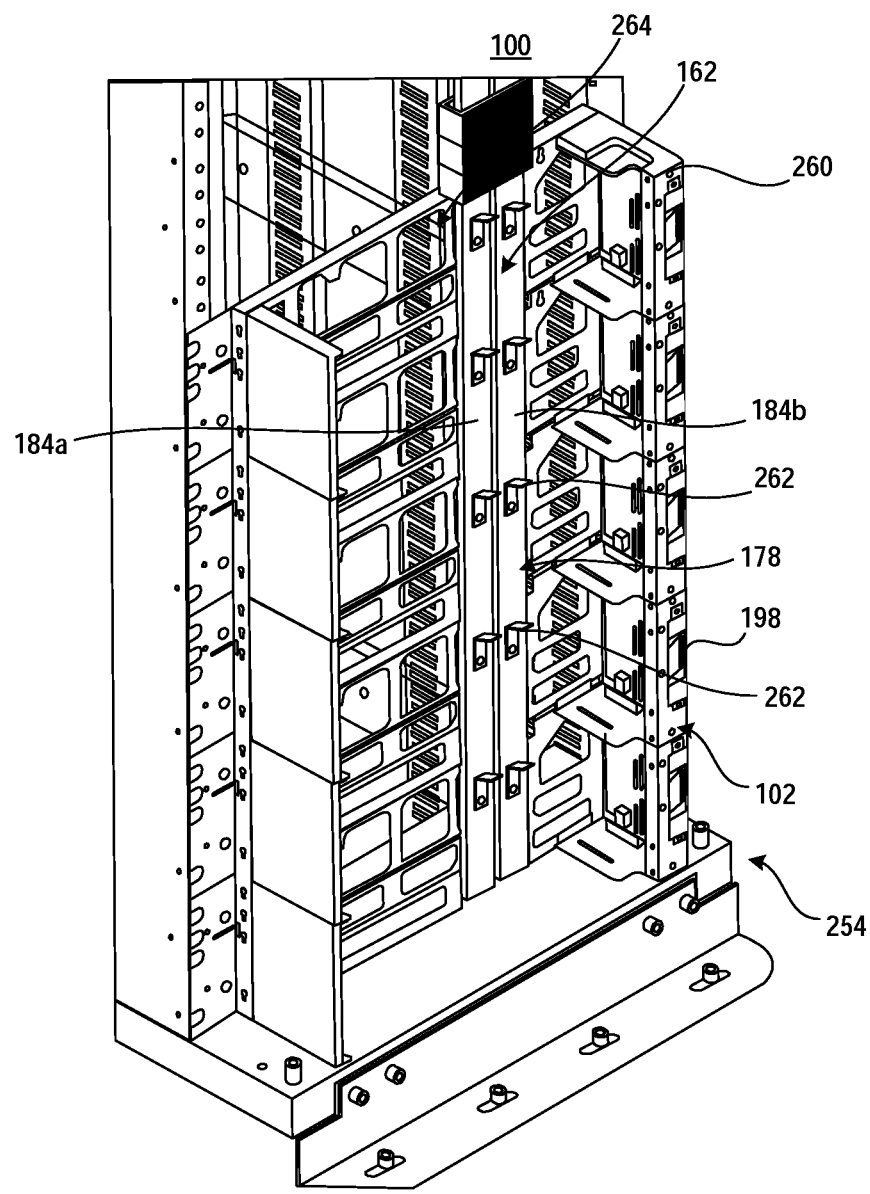
FIG. 5 illustrates a rear detail view of a lower portion of the rack-based IHS of FIG. 4 with fan bay receptacles, according to one embodiment.

FIGS. 4-5 illustrate fan bay receptacles 260 that are attached to the rack 102 to receive respective fan bay modules 154 (FIG. 1). Each fan bay receptacle 260 positions an inserted fan bay module 154 into contact with pairs of rear facing conductive components 262 vertically spaced on the first and second busbar segments 178, 180. Shrouds 264 are attachable to the rear of the rack 102 to block rear access to pairs of rear facing conductive components 262 that are not behind fan bay modules 154.

Figure 6:
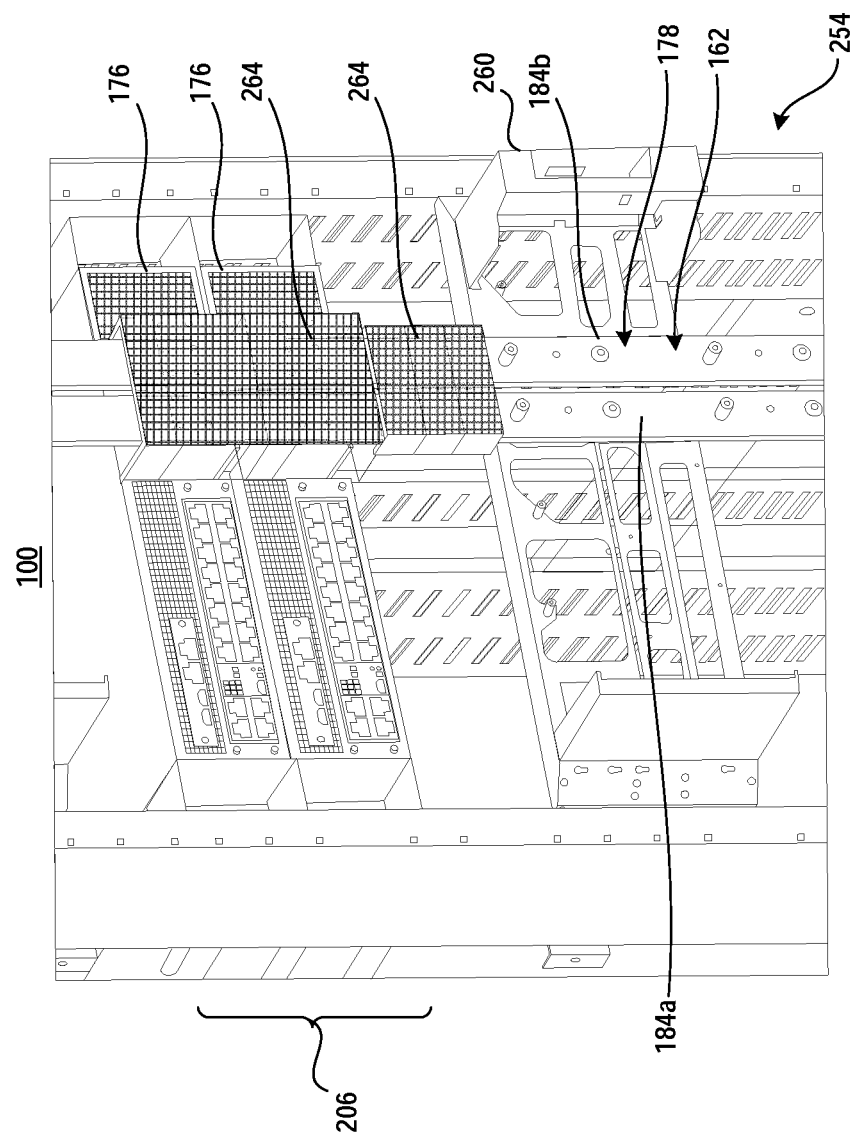
FIG. 6 illustrates a rear detail view of a center, switch zone of the rack-based IHS of FIG. 4, according to one embodiment.
Figure 7:
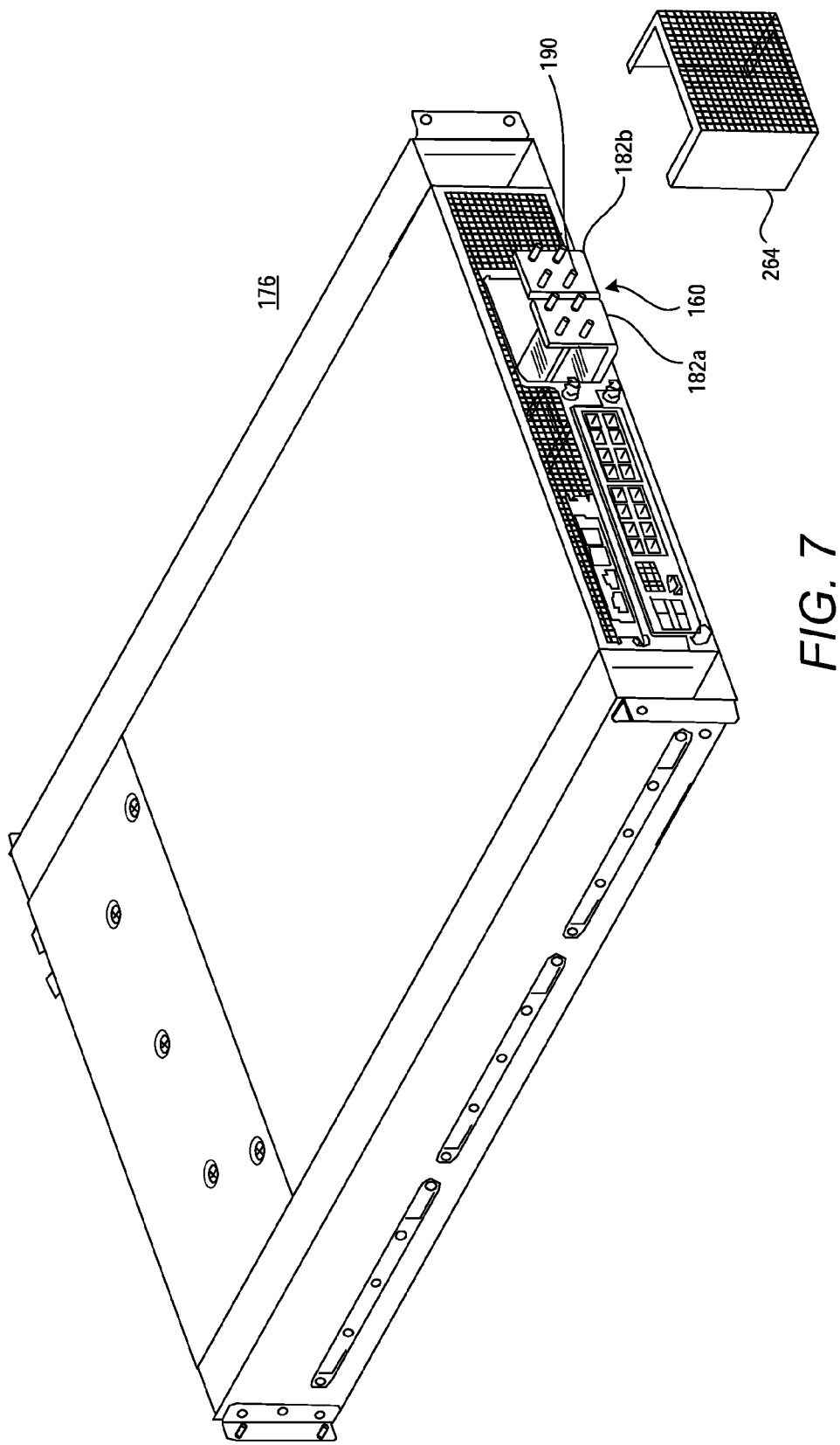
FIG. 7 illustrates a rear isometric view of a power bay chassis of the rack-based IHS of FIG. 4 with a shroud removed, according to one embodiment.
Figure 8:
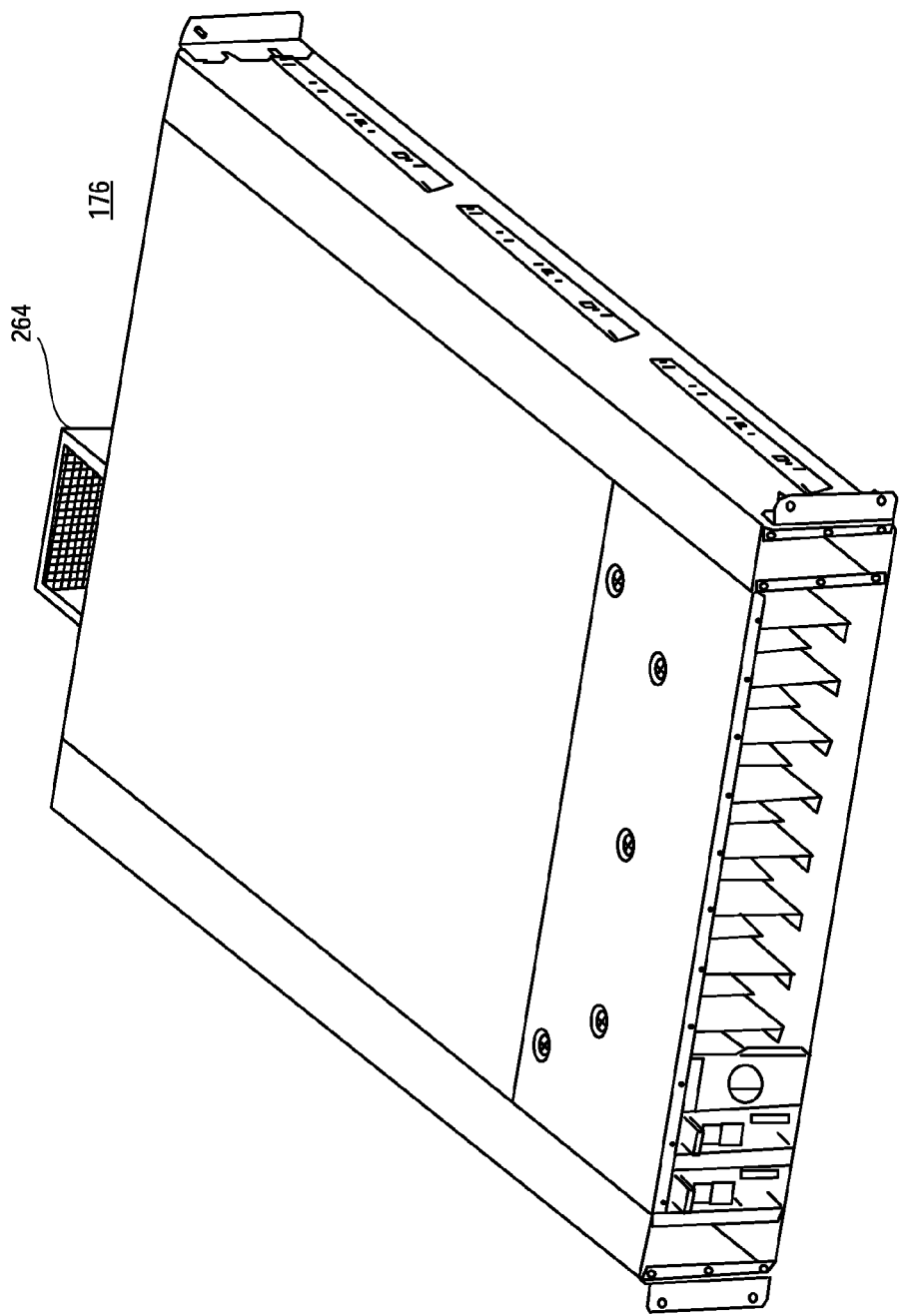
FIG. 8 illustrates a front isometric view of the power bay chassis of FIG. 7 with the shroud installed, according to one embodiment.

FIG. 6 illustrates the rear side view 254 of the power bay chassis 176 in the switch zone 206 of the rack 102. The electrical attachment between the power bay chassis 176 and the upper and lower vertical busbar segments 178 are covered by shrouds 264 (FIG. 5). FIG. 7 illustrates the shroud 264 removed to expose the PDU 160 of the power bay chassis 176, including a positive distribution conductor 182a and a negative distribution conductor 182b. Aft-facing pins 190 are aligned to engage holes 188 (FIG. 4) in the middle vertical busbar segment 256 and one of the first and second vertical busbar segments 178, 180 (FIG. 4). FIG. 8 illustrates a front view of the power bay chassis 176 prior to receiving PSUs 158 (FIG. 1).

Figure 9:
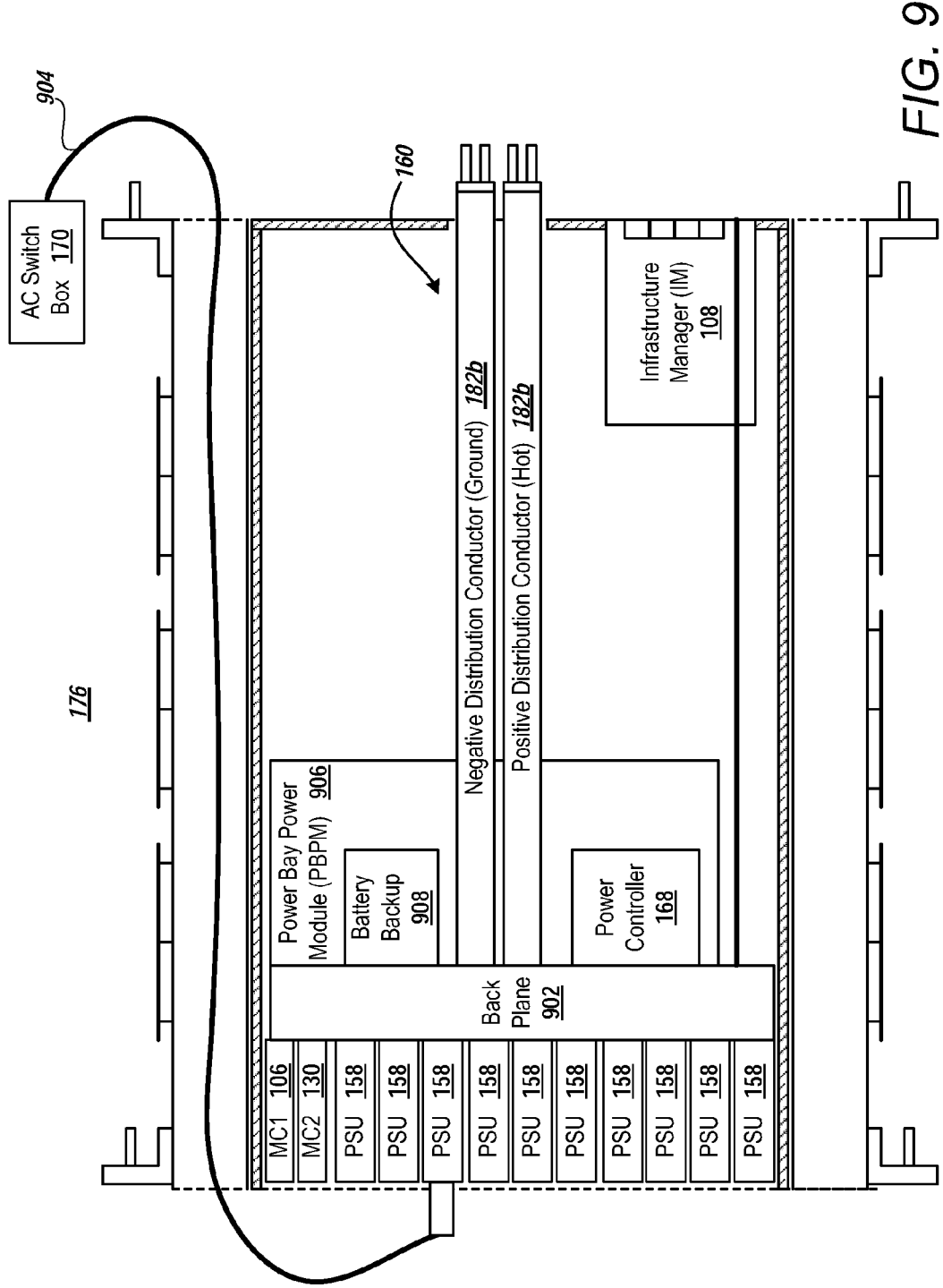
FIG. 9 illustrates a block diagram of the power bay chassis of FIG. 7, according to one embodiment.

FIG. 9 illustrates the power bay chassis 176 with functional components installed. PSUs 158 have been inserted at the front of the power bay chassis 176 into electrical contact with a back plane 902. A management controller (MC1) 106 and a secondary management controller (MC2) 130 are also inserted in the front of the power bay chassis 176 in electrical contact with a back plane 902. An AC electrical cord 904 brings power from AC switch box 170 through one of two side cord channels attached to lateral sides of the power bay chassis 176. A power bay power module (PBPM) 906 is in electrical contact with an interior side of the back plane 902. The PBPM 910 includes a battery backup 908. An IM 108 is also contained in the power bay chassis 176. The PDU 160 including the positive and negative distribution conductors 182a-182b are electrically connected to the back plane 902 and terminate in aft-facing pins 190 that engage the holes in the middle vertical busbar segment 256 (FIG. 4).

Figure 10:
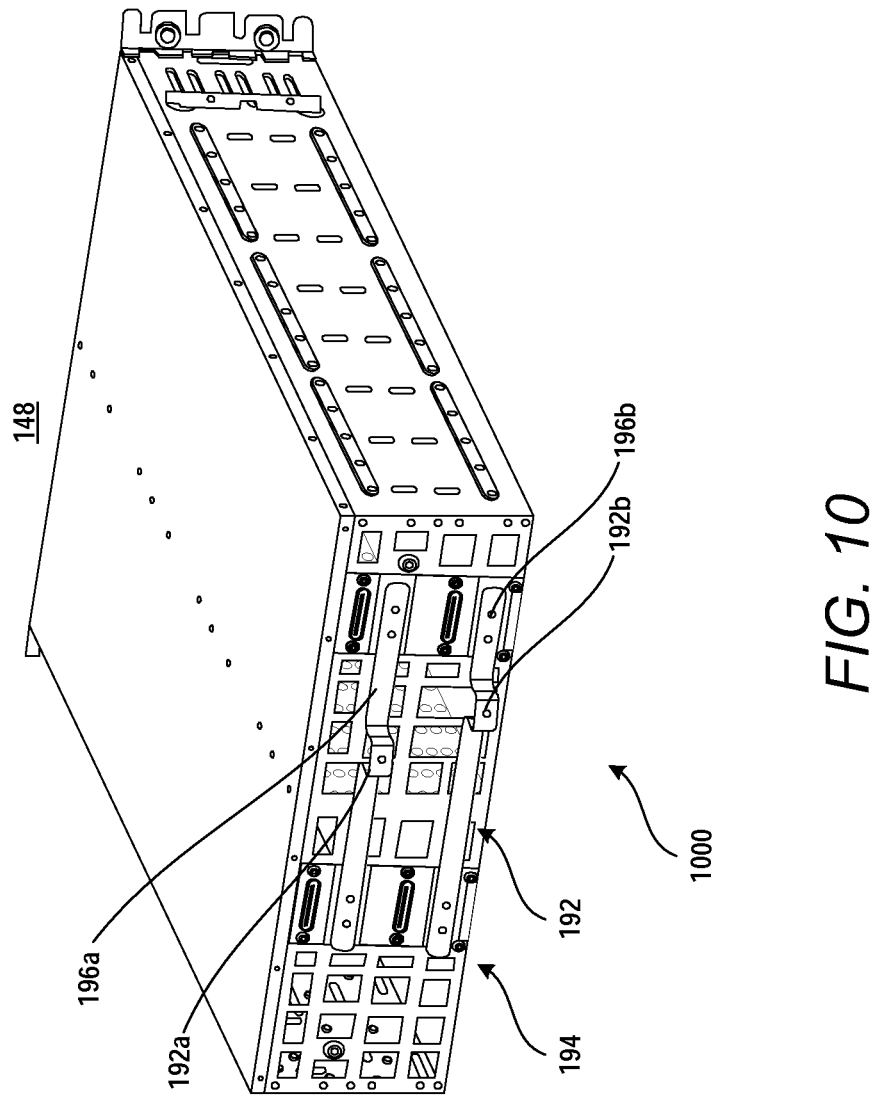
FIG. 10 illustrates a rear isometric view of a block chassis of the rack-based IHS, according to one embodiment.

FIG. 10 illustrates a rear side view 1000 of the block chassis 148 including an aft-facing busbar connector 192, in particular a positive connector 192a and a negative connector 192b, aligned to contact, physically attach, and electrically communicate with one of the first and second vertical busbar segments 178, 180 when the block chassis 148 is horizontally inserted into the rack 102 from the front (FIGS. 2-4). For example, the aft-facing busbar connector 192 may include a horizontal busbar assembly 194 as an attachment component for engaging the first and second vertical busbar segments 178, 180 (FIG. 4). Each horizontal busbar assembly 194 may include a positive horizontal conductor 196a and a negative horizontal conductor 196b. The horizontal busbar assembly 194 may electrically communicate with each of more than one full width, partial-width or fractional-width configuration, such as one-third width blocks and half-width blocks.

Figure 11A:
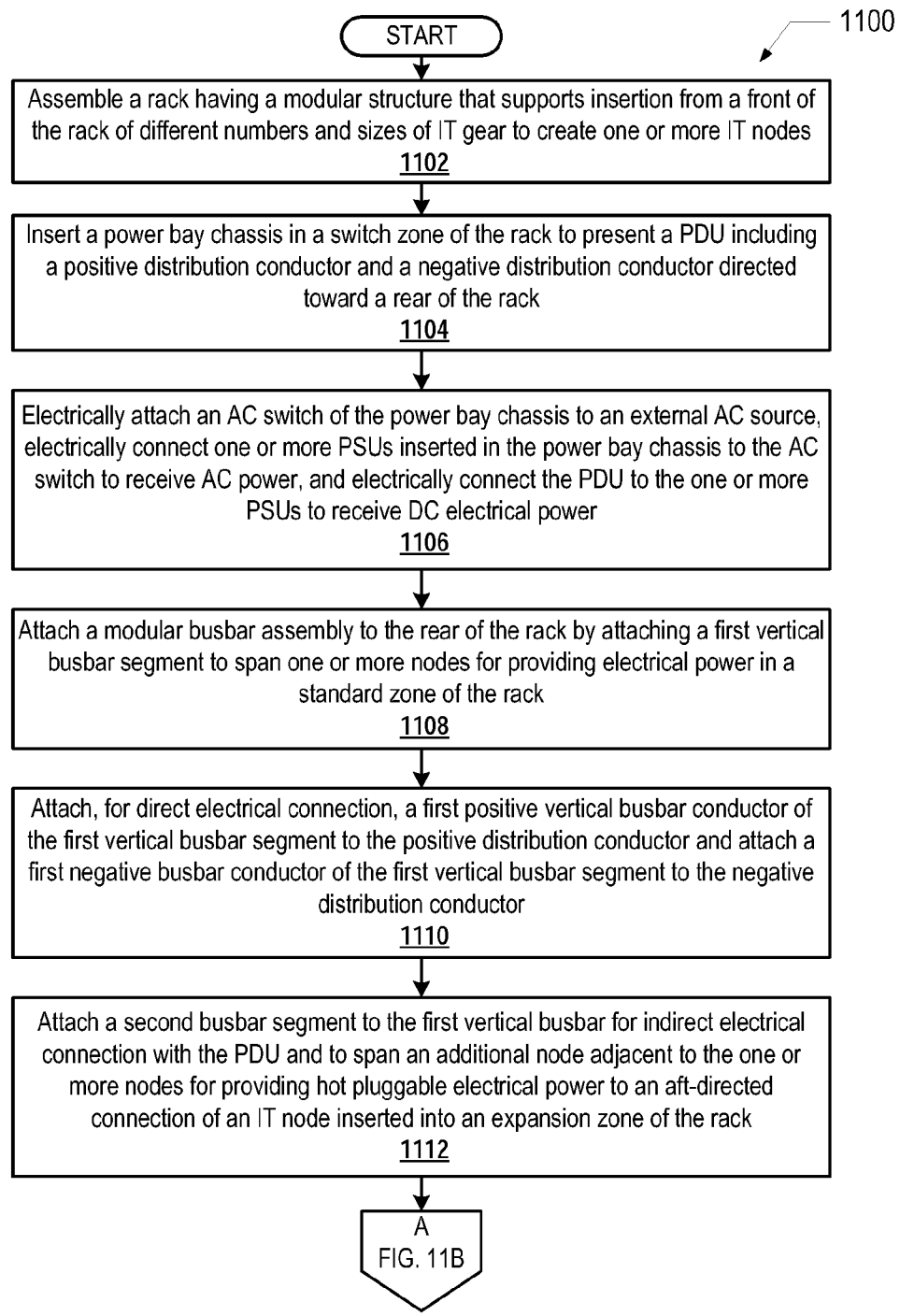
FIGS. 11A-11B illustrate a flow diagram of a method for assembling a rack-based IHS with a modular busbar assembly, according to one embodiment.
Figure 11B:
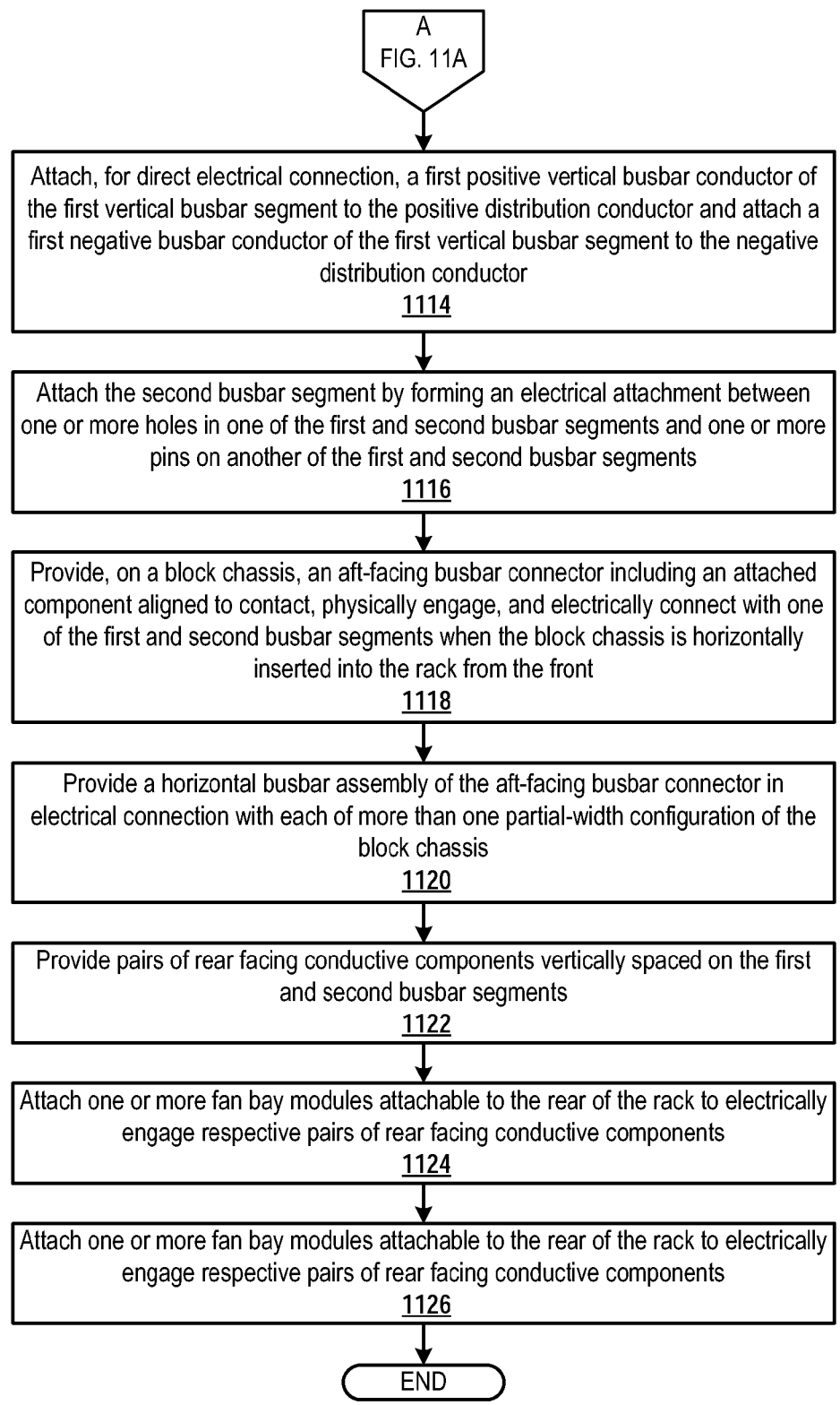

FIGS. 11A-11B illustrate a method 1100 for providing power to block components within a modular, scalable and/or expandable rack-based IHS. With initial reference to FIG. 11A, the method 1100 includes assembling a rack having a modular structure that supports insertion from a front of the rack of different numbers and sizes of IT gear to create one or more IT nodes (block 1102). In block 1104, the method 1100 includes inserting a power bay chassis in a switch zone of the rack to present a PDU including a positive distribution conductor and a negative distribution conductor directed toward a rear of the rack. In one embodiment, the method 1100 includes electrically attaching an AC switch of the power bay chassis to an external AC source, electrically connecting one or more PSUs inserted in the power bay chassis to the AC switch to receive AC power, and electrically connecting the PDU to the one or more PSUs to receive DC electrical power (block 1106).

In block 1108, the method 1100 includes attaching a modular busbar assembly to the rear of the rack by attaching a first vertical busbar segment to span one or more nodes for providing electrical power in a standard zone of the rack. In an example embodiment, the method 1100 includes attaching, for direct electrical connection, a first positive vertical busbar conductor of the first vertical busbar segment to the positive distribution conductor and attaching a first negative busbar conductor of the first vertical busbar segment to the negative distribution conductor (block 1110). The method 1100 includes attaching a second vertical busbar segment to the first vertical busbar for indirect electrical connection with the PDU (block 1112). The second vertical busbar segment spans an additional node adjacent to the one or more nodes for providing hot pluggable electrical power to an aft-directed connection of an IT node inserted into an expansion zone of the rack. Continuing in FIG. 11B, the method 1100 includes attaching, for direct electrical connection, a first positive vertical busbar conductor of the first vertical busbar segment to the positive distribution conductor and attaching a first negative busbar conductor of the second vertical busbar segment to the negative distribution conductor (block 1114). In one embodiment, the method 1100 includes attaching the second busbar segment by forming an electrical attachment between one or more holes in one of the first and second busbar segments and one or more pins on another of the first and second busbar segments (block 1116).

In one embodiment, the method 1100 includes providing, on a block chassis, an aft-facing busbar connector including an attached component aligned to contact, physically engage, and electrically connect with one of the first and second busbar segments when the block chassis is horizontally inserted into the rack from the front (block 1118). In block 1120, for a block chassis of more than one partial-width configuration, the method 1100 includes providing a horizontal busbar assembly of the aft-facing busbar connector electrically connected to each of the more than one partial-width configuration.

In one embodiment, the method 1100 includes providing pairs of rear facing conductive components vertically spaced on the first and second busbar segments (block 1122). In block 1124, the method includes attaching one or more fan bay modules attachable to the rear of the rack to electrically engage respective pairs of rear facing conductive components. The method further includes attaching a shroud to the rear of the rack to block rear access to one pair of rear facing conductive components (block 1126). Then method 1100 ends.

FIG. 12 illustrates a rack-based IHS 1200 which includes a rack assembly 1202 having a sectional busbar assembly 1204 that is expandable, modular and scalable for each IT node 1206 inserted into the rack assembly 1202. The rack assembly 1202 has a modular structure that supports insertion from a front of the rack assembly 1202 of different numbers and sizes of IT gear to create the one or more IT nodes 1206. In addition, the sectional busbar assembly 1204 may provide electrical power to IT nodes 1206 inserted in a first frame assembly 1208 of the rack assembly 1202. Alternatively or subsequently, the sectional busbar assembly 1204 may provide electrical power to IT nodes 1206 inserted into both the first frame assembly 1208 and a second frame assembly 1210 received on top thereof that serves for expansion.

A power bay chassis 1212 inserted into the rack assembly 1202 has a power distribution unit 1214 directed toward a rear of the rack assembly 1202. A first modular busbar assembly 1216, which in the "one stick" design of FIG. 12 is the same as the sectional busbar assembly 1204, is attached to the rear 1217 of the rack assembly 1202. The first modular busbar assembly 1216 includes a power busbar assembly 1218a and a ground busbar assembly 1218b. Each of the power and ground busbar assemblies 1218a-b includes one or more block busbars 1220 lengthwise attached to span a corresponding one or more IT nodes 1206 inserted into the rack assembly 1202. The one or more IT nodes 1206 are inserted into electrical connection with the first modular busbar assembly 1216. A PDU connecting busbar 1222 is attached between the power distribution unit 1214 and the one or more block busbars 1220 to provide electrical power to the one or more IT nodes 1206. In one embodiment, the first modular busbar assembly 1216 includes one or more additional block busbars 1220 lengthwise attached to span a corresponding one or more additional IT nodes 1206 inserted into an expansion zone 1224 of the second frame assembly 1210. A top-of-rack (TOR) connecting bar 1226 is attached between the one or more block busbars 1220 in the first frame assembly 1208 and the one or more additional block busbars 1220 to provide electrical power to the one or more additional IT nodes 1206 in the second frame assembly 1210.

In one embodiment, a connection 1228 between a selected block busbar 1220 and one of a PDU connecting busbar 1222 and another block busbar 1220 includes an overlapping area of at least 20 cm2 (e.g., 40 mm wide by 53 mm high) with a respective thickness of each of the selected additional block busbar 1220 and the one of the PDU connecting busbar 1222 and another block busbar 1220 being at least 8 mm at the overlapping area.

FIG. 13 illustrates a top block bus bar 1230 of the first modular busbar assembly 1216 attached to a top notched portion 1232 of each of block busbar 1220 (power and ground). Top block bus bar 1230 includes a standoff 1234 for electrically connecting to a fan board (not shown). In one or more embodiments, notched portions 1232 on both the top and bottom of the block busbars 1220 allow use of a thick conductive busbar material that is relatively inflexible but is assembled into a straight vertical plane. Since the two block busbars 1220 span the top-most IT node 1206 in the second frame assembly 1210 of the rack assembly 1202, there is not another block busbar 1220 to utilize the top notched portion 1232 and to provide a standoff 1234 (i.e., attachment) for a fan board. Top block bus bars 1230 may also be used at the top of the first frame assembly 1208 in lieu of a connecting bar 1226 (FIG. 12) when the second frame assembly 1210 is not installed. FIG. 14 illustrates a top block busbar 1230 that is not installed.

FIG. 15 illustrates the TOR connecting bar 1226 attached between block bars 1220 of the first frame assembly 1208 and block bars 1220 of the second frame assembly 1210. Over the top notched portion 1232 of the lower block busbars 1220, the TOR connecting busbar 1226 also includes a standoff 1234 for electrically connecting to a fan board (not shown). FIG. 16 illustrates a TOR connecting busbar 1226 that is not installed.

Figure 20:
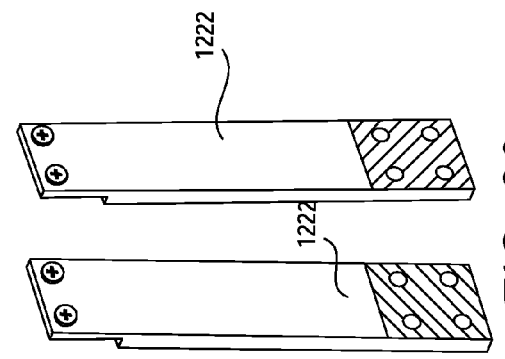
FIG. 20 illustrates an isometric view of power distribution unit (PDU) connecting busbars that are not installed, according to one embodiment.
Figure 19:
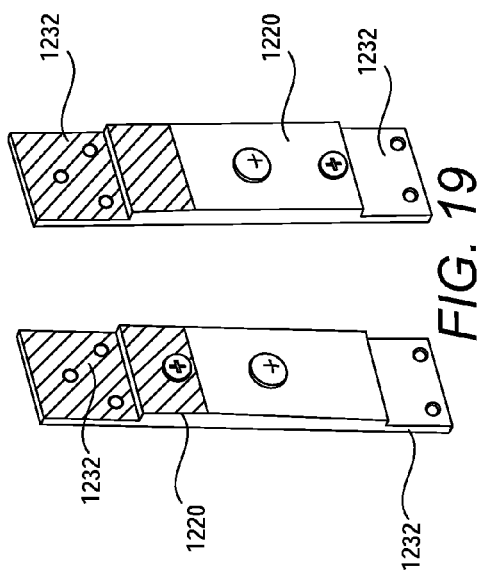
FIG. 19 illustrates an isometric view of block busbars having top and bottom notch portions
Figure 18:
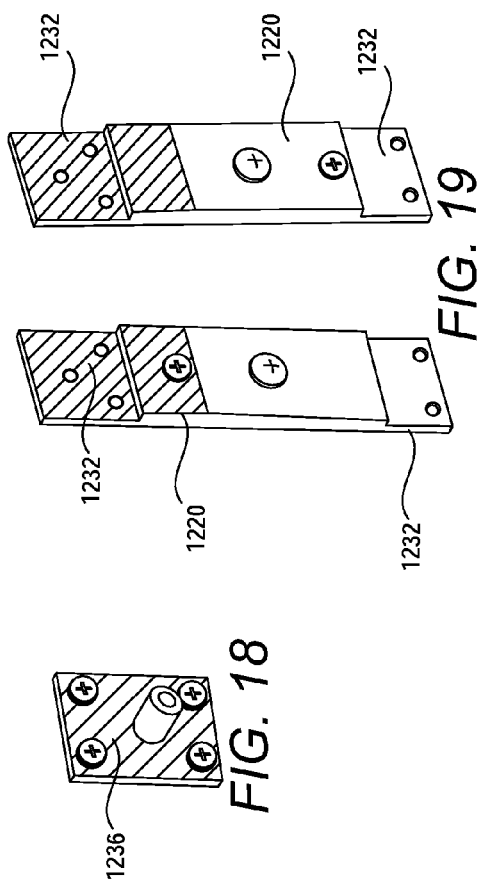
FIG. 18 illustrates an isometric view of a connecting block that is not installed, according to one embodiment.
Figure 17:
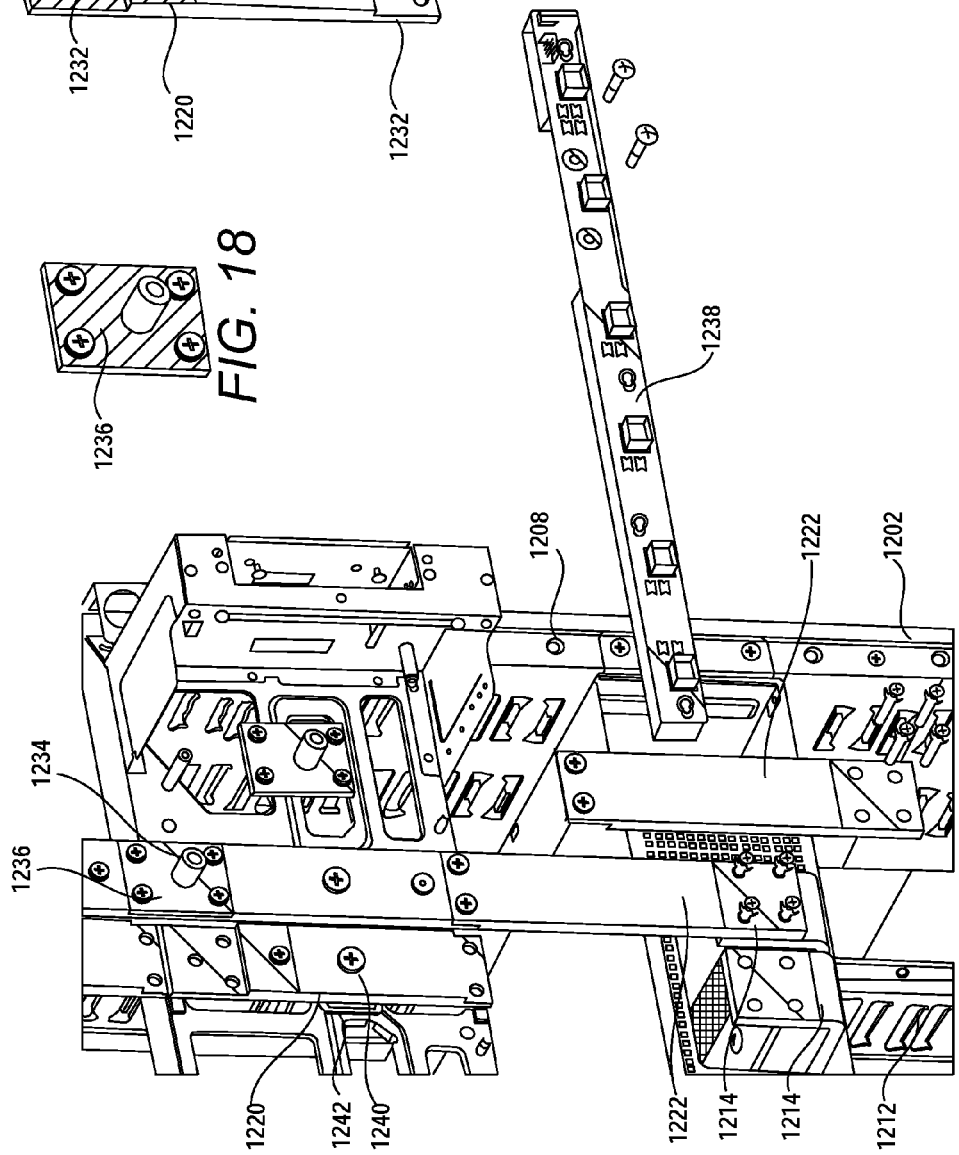
FIG. 17 illustrates an rear isometric view of a central portion of the first frame assembly of the rack assembly, according to one embodiment.

FIG. 17 illustrates a central portion of the first frame assembly 1208 of the rack assembly 1202. The power distribution unit 1214 of the power bay chassis 1212 is attached to PDU connecting bars 1222. Connecting blocks 1236 have standoffs 1234 for mounting of a fan board 1238 and are sized to span and to be attached to adjacent notched portions 1232 of two block busbars 1220. Nonconductive mounting fasteners 1240 pass through the block busbars 1220 and an insulative spacer 1242 for attachment to the rack assembly 1202. FIG. 18 illustrates a connecting block 1236 that is not installed. FIG. 19 illustrates block busbars 1220 having top and bottom notch portions 1232. FIG. 20 illustrates PDU connecting bars 1222 that are not installed.

Figure 21:
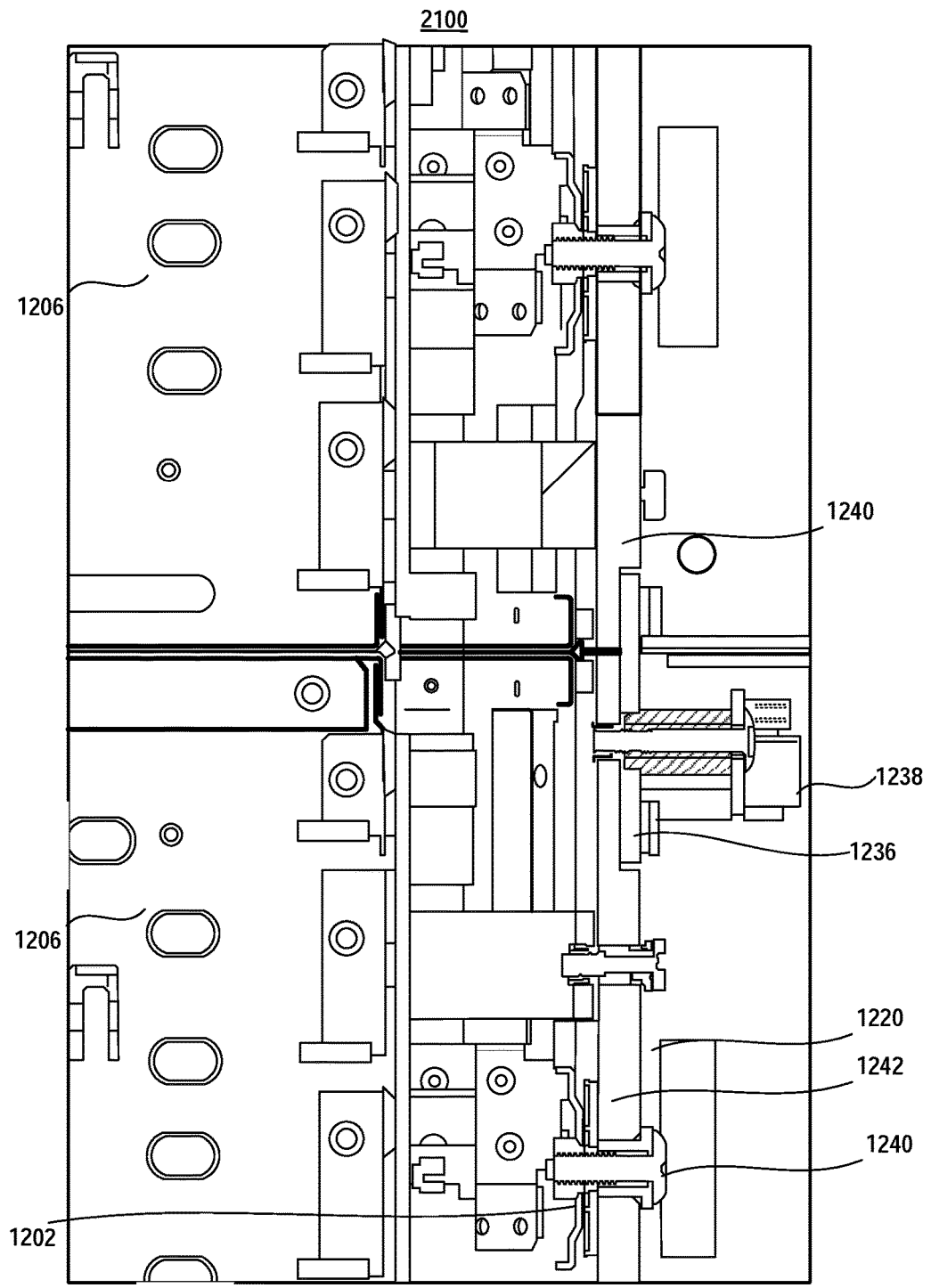
FIG. 21 illustrates a side view in vertical cross sectional through a connecting block attached to a fan board, according to one embodiment.

FIG. 21 illustrates a side view 2100 in vertical cross section through a connecting block 1236 attached to a fan board 1238. The connecting block 1236 is also physically and electrically connected to two block busbars 1220, each in turn electrically connected from a front side to IT nodes 1206. Nonconductive mounting fasteners 1240 pass through the block busbars 1220 and an insulative spacer 1242 for attachment to the rack assembly 1202.

Figure 22:
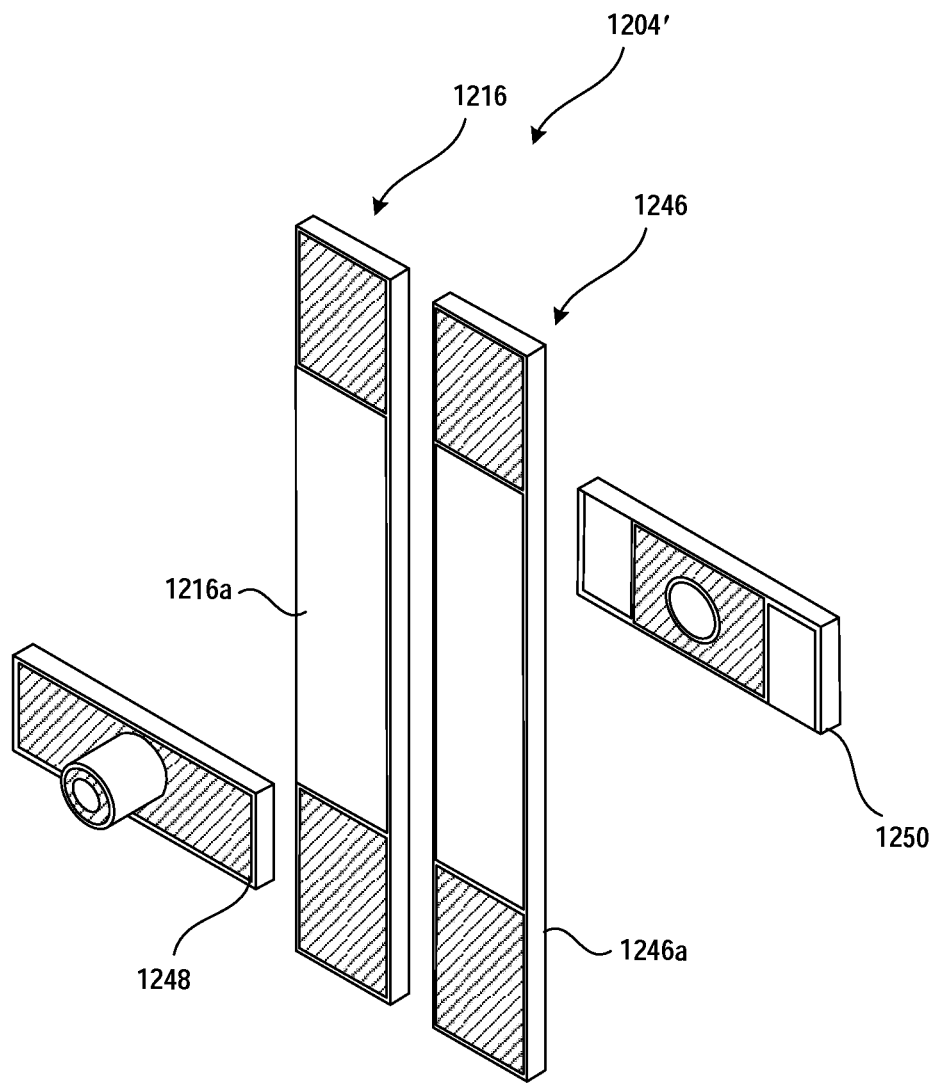
FIG. 22 illustrates an isometric disassembled view of an alternative sectional busbar assembly having a two stick design, according to one embodiment.
Figure 23:
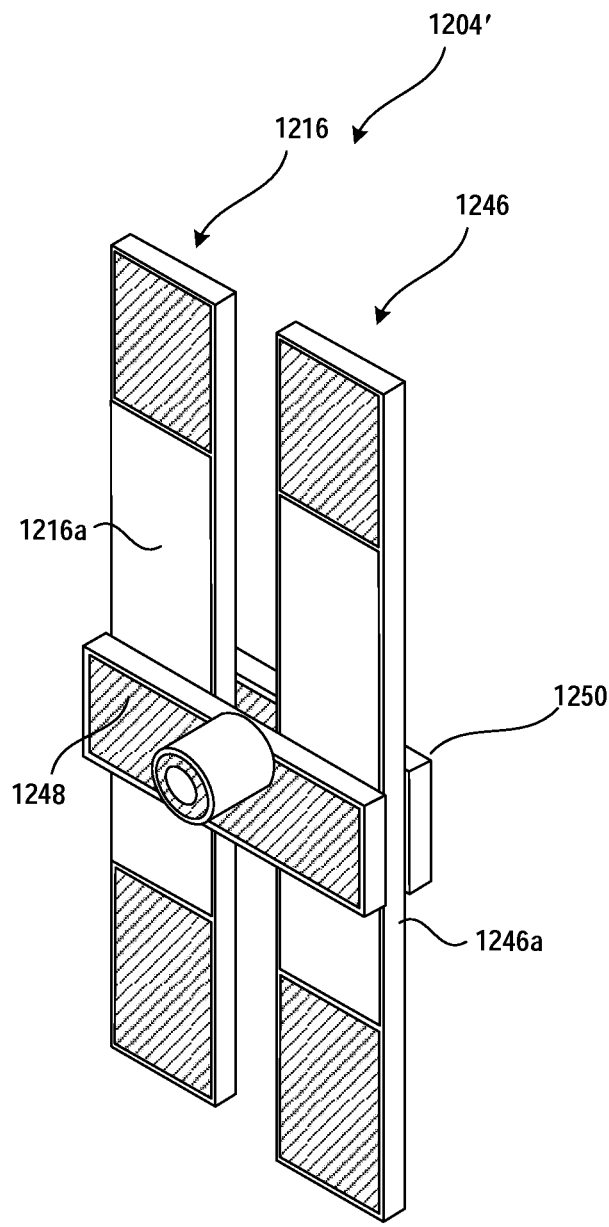
FIG. 23 illustrates an isometric assembled view of an alternative sectional busbar assembly having a two stick design, according to one embodiment.

FIGS. 22-23 illustrate an alternative sectional busbar assembly 1204' having a two stick design of a first modular busbar assembly 1216 and further including a second modular busbar assembly 1246, which may be identical to the first modular busbar assembly 1216. Both the first and second modular busbar assemblies 1216, 1246 may be rigid and thick for carrying a large current load. Alternatively, each of the first and second modular busbar assemblies 1216, 1246 may be thinner for carrying half of the power load but being flexible for attachment without notching. In FIG. 23, the power busbar assemblies 1216a, 1246a and the ground busbar assemblies (not shown) of the first and second modular busbar assemblies 1216, 1246 respectively are electrically connected by front and back cross bars 1248, 1250 that are fastened together through the power busbar assemblies 1216a, 1246a. In an exemplary embodiment, the first and second modular busbar assemblies 1216, 1246 are formed to have a flexible busbar thickness of up to and including 4 mm.

Figure 24:
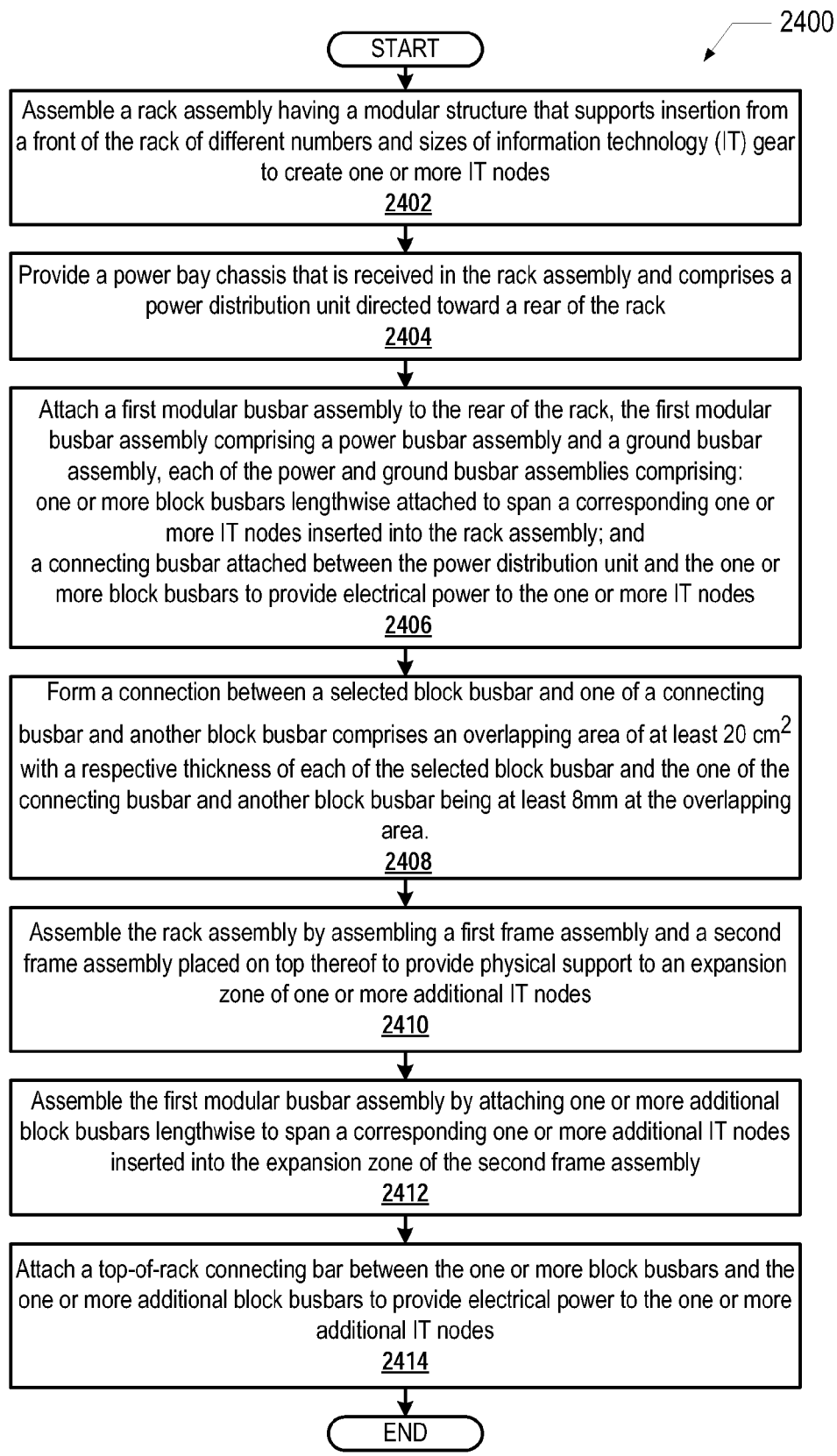
FIG. 24 illustrates a flow diagram of a method for assembling a modular busbar assembly for a rack-based IHS, according to one embodiment.

FIG. 24 illustrates a method 2400 for assembling a modular busbar assembly for a rack-based IHS. The method 2400 includes assembling a rack assembly having a modular structure that supports insertion from a front of the rack of different numbers and sizes of IT gear to create one or more IT nodes (block 2402). In block 2404, the method 2400 includes providing a power bay chassis that is received in the rack assembly and comprises a power distribution unit directed toward a rear of the rack assembly. In block 2406, method 2400 includes attaching a first modular busbar assembly to the rear of the rack assembly, the first modular busbar assembly comprising a power busbar assembly and a ground busbar assembly. Each of the power and ground busbar assemblies include one or more block busbars lengthwise attached to span a corresponding one or more IT nodes inserted into the rack assembly. Each of the power and ground busbar assemblies also include a connecting busbar attached between the power distribution unit and the one or more block busbars to provide electrical power to the one or more IT nodes.

In one embodiment, the method 2400 further includes forming a connection between a selected block busbar and one of a connecting busbar and another block busbar comprising an overlapping area of at least 20 cm2 with a respective thickness of each of the selected block busbar and the one of the connecting busbar and another block busbar being at least 8 mm at the overlapping area (block 2408).

In one embodiment, the method 2400 further comprises assembling the rack assembly by assembling a first frame assembly and a second frame assembly placed on top thereof to provide physical support to an expansion zone of one or more additional IT nodes (block 2410). In block 2412, the method 2400 further comprises assembling the first modular busbar assembly by attaching one or more additional block busbars lengthwise to span a corresponding one or more additional IT nodes inserted into the expansion zone of the second frame assembly. The method 2400 further includes attaching a top-of-rack connecting bar between the one or more block busbars and the one or more additional block busbars to provide electrical power to the one or more additional IT nodes (block 2414). Method 2400 then ends.

Figure 25:
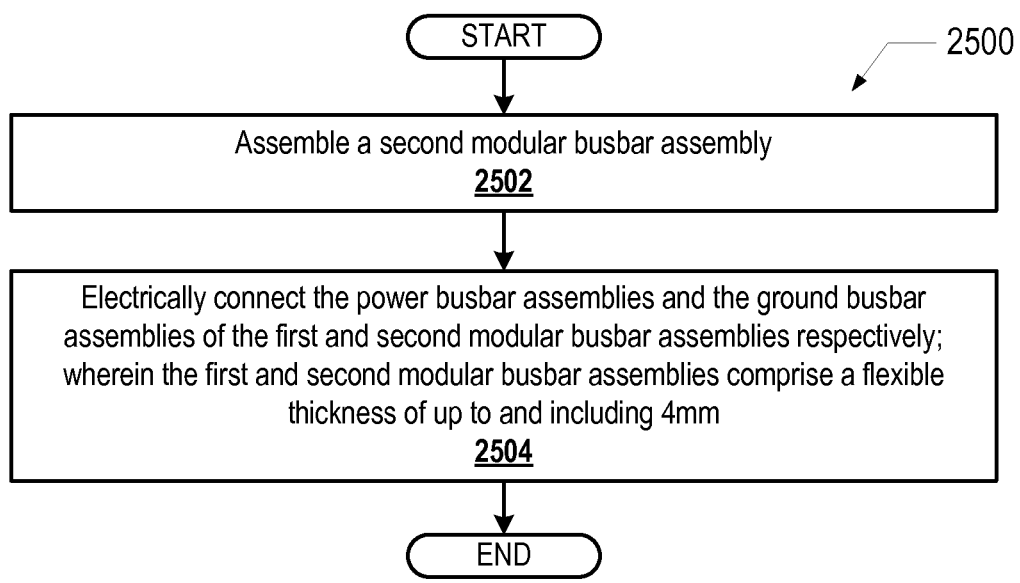
FIG. 25 illustrates a flow diagram of an alternative method for assembling a two-stick design of a modular busbar assembly for a rack-based IHS, according to one embodiment.

FIG. 25 illustrates a method 2500 for assembling a two stick busbar design rather than a one stick design for a more flexible busbar assembly that carry current levels of 1200A. In block 2502, the method 2500 includes assembling a second modular busbar assembly. The method 2500 further includes electrically connecting the power busbar assemblies and the ground busbar assemblies of the first and second modular busbar assemblies respectively (block 2504). The first and second modular busbar assemblies each have a flexible thickness of up to and including 4 mm.

In the above described flow charts of FIGS. 11A-11B, 24 and 25 one or more of the methods may be embodied in an automated manufacturing system that perform a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A rack-based information handling system (IHS), comprising:
   a rack having a modular structure that supports insertion from a front of the rack of different numbers and sizes of information technology (IT) gear to create one or more IT nodes, the rack vertically provisioned into an upper standard zone, a switch zone, and a lower standard zone, the switch zone designed with at least one switch bay and at least one power bay, each of the at least one switch bay and the at least one power bay configured to enable insertion of a fill-width chassis, the upper standard zone and the lower standard zone each divided into tiers by shelves, the shelves including full-width shelfs providing full-width IT bays for insertion of full-width IT nodes and shelves including partitions defining partial-width bays for insertion of multiple side-by-side partial-width IT nodes;
   a power bay chassis having an exterior casing and configured as a full width IT node for insertion into one of the at least one power bay chassis of the switch zone, the exterior casing presenting a volumetric enclosure with opposed side panels, a top and a bottom panel, and a back and a front side, the power bay chassis being a separate physical component from other IT nodes within the rack, the power bay chassis further comprising, within the volumetric enclosure, a plurality of power supply units that electrically connects to an alternating current (AC) switch to receive AC power, a power controller, and a power distribution unit (PDU) having a positive distribution conductor and a negative distribution conductor directed toward a rear of the rack, the PDU electrically connected to the one or more PSUs to receive direct current (DC) electrical power; and a modular busbar assembly attached to the rear of the rack, the modular busbar assembly comprising (i) a first positive and a first negative vertical busbar segment extending vertically along a rear of the rack and in direct electrical connection, respectively, to the positive distribution conductor and to the negative distribution conductor of the PDU and spanning one or more nodes inserted into the rack to provide hot pluggable electrical power to an aft-directed connection of an IT node inserted into the rack and (ii) second, separate, positive and negative vertical busbar segments modularly attached to the first positive and negative vertical busbar segments, respectively, to electrically connect with the positive and negative distribution conductor, respectively, of the PDU, the second, separate positive and negative vertical busbar segments extending vertically and spanning at least one additional node that is vertically adjacent to the one or more nodes powered by the first positive and negative busbar segments to provide electrical power to the additional adjacent nodes.

2. The rack-based IHS of claim 1, wherein one of the first and second busbar segments comprises one or more holes and another of the first and second busbar segments comprises corresponding one or more pins to form an electrically conductive attachment.

3. The rack-based IHS of claim 1, further comprising:
a block chassis comprising an aft-facing busbar connector aligned to contact and electrical communicate with one of the first and second busbar segments when the block chassis is horizontally inserted into the rack from the front.

4. The rack-based IHS of claim 3, wherein the aft-facing busbar connector comprises a positive and a negative busbar connector and an attachment component to physically engage the one of the first and second busbar segments.

5. The rack-based IHS of claim 3, wherein:
the block chassis further comprises more than one partial-width configuration of IT nodes; and
the aft-facing busbar connector further comprises a positive and a negative horizontal busbar assembly in electrical connection, respectively to the positive and a negative busbar connector of each of the more than one partial-width configuration of IT nodes.

6. The rack-based IHS of claim 1, wherein the rack further comprises:
a first frame assembly having a first number of IT nodes spanned by the first vertical busbar segment; and
a second frame assembly mountable on the first frame assembly and having a second number of IT nodes spanned at least in part by the second busbar segment.

7. The rack-based IHS of claim 1, wherein the rack comprises a standard zone that receives the one or more nodes, an expansion zone that receives an adjacent node, and a switch zone that receives the power bay chassis.

8. The rack-based IHS of claim 1, wherein
the AC switch is electrically connected to an external AC source.

9. The rack-based IHS of claim 1, further comprising:
pairs of rear facing conductive components vertically spaced on the first and second busbar segments;
one or more fan bay modules attachable to the rear of the rack to electrically engage one pair of rear facing conductive components; and
a shroud attachable to the rear of the rack to block rear access to another pair of rear facing conductive components.

10. A method of assembling a rack-based information handling system (IHS), the method comprising:
assembling a rack having a modular structure that supports insertion from a front of the rack of different numbers and sizes of information technology (IT) gear to create one or more IT nodes, the rack vertically provisioned into an upper standard zone, a switch zone, and a lower standard zone, the switch zone designed with at least one switch bay and at least one power bay, each of the at least one switch bay and the at least one power bay configured to enable insertion of a fill-width chassis, the upper standard zone and the lower standard zone each divided into tiers by shelves, the shelves including full-width shelfs providing full-width IT bays for insertion of full-width IT nodes and shelves including partitions defining partial-width bays for insertion of multiple side-by-side partial-width IT nodes;
inserting a power bay chassis in the rack to present a power distribution unit (PDU) having a positive distribution conductor and a negative distribution conductor directed toward a rear of the rack, the power bay chassis having an exterior casing and configured as a full width IT node for insertion into one of the at least one power bay chassis of the switch zone, the exterior casing presenting a volumetric enclosure with opposed side panels, a top and a bottom panel, and a back and a front side, the power bay chassis being a separate physical component from other IT nodes within the rack, the power bay chassis further comprising, within the volumetric enclosure, a plurality of power supply units (PSUs) that electrically connect to an alternating current (AC) switch to receive AC power, a power controller, and the PDU, the PDU electrically connected to the plurality of PSUs to receive direct current (DC) electrical power; and
attaching a modular busbar assembly to the rear of the rack by:
attaching a first positive and a first negative vertical busbar segment in direct electrical connection, respectively to the positive and negative power distribution unit to span one or more nodes for providing hot pluggable electrical power to an aft-directed connection of an IT node inserted into the rack; and
attaching a second, positive and a second negative vertical busbar segment, respectively to the first positive and the first negative vertical busbar for electrically connection with the PDU, the second positive and negative vertical busbar segments extending vertically and spanning at least one additional node adjacent to the one or more nodes powered via the first positive and negative vertical busbar and providing electrical power to the at least one additional adjacent node.

11. The method of claim 10, wherein attaching the second busbar segment further comprises forming an electrical attachment between one or more holes in one of the first and second busbar segments and one or more pins on another of the first and second busbar segments.

12. The method of claim 10, further comprising:
providing, on a block chassis, an aft-facing busbar connector aligned to contact and electrical communicate with one of the first positive and negative and second positive and negative busbar segments when the block chassis is horizontally inserted into the rack from the front.

13. The method of claim 12, wherein providing the aft-facing busbar connector comprises providing an attachment component of the aft-facing busbar connector to physically engage the one of the first and second busbar segments.

14. The method of claim 12, wherein:
the block chassis further comprises more than one partial-width configuration of IT nodes; and
the aft-facing busbar connector further comprises a horizontal busbar assembly in electrical connection to each of the more than one partial-width configuration of IT nodes.

15. The method of claim 10, wherein the rack further comprises:
a first frame assembly having a first number of IT nodes spanned by the first vertical busbar segment; and
a second frame assembly mountable on the first frame assembly and having a second number of IT nodes spanned at least in part by the second busbar segment.

16. The method of claim 10, wherein the rack comprises a standard zone that receives the one or more nodes, an expansion zone that receives the adjacent node, and a switch zone that receives the power bay chassis.

17. The method of claim 10, further comprising:
electrically attaching an alternating current (AC) switch of the power bay chassis to an external AC source; and
electrically connecting the plurality of PSUs inserted in the power bay chassis to the AC switch to receive AC power.

18. The method of claim 10, further comprising:
providing pairs of rear facing conductive components vertically spaced on the first and second busbar segments;
attaching one or more fan bay modules attachable to the rear of the rack to electrically engage respective pairs of rear facing conductive components; and
attaching a shroud to the rear of the rack to block rear access to one pair of rear facing conductive components.

19. A rack-based information handling system (IHS), comprising:
a rack assembly having a modular structure that supports insertion from a front of the rack of different numbers and sizes of information technology (IT) gear to create one or more IT nodes, the rack vertically provisioned into an upper standard zone, a switch zone, and a lower standard zone, the switch zone designed with at least one switch bay and at least one power bay, each of the at least one switch bay and the at least one power bay configured to enable insertion of a fill-width chassis, the upper standard zone and the lower standard zone each divided into tiers by shelves, the shelves including full-width shelfs providing full-width IT bays for insertion of full-width IT nodes and shelves including partitions defining partial-width bays for insertion of multiple side-by-side partial-width IT nodes;
a power bay chassis having an exterior casing and configured as a full width IT node for insertion into one of the at least one power bay chassis of the switch zone, the exterior casing presenting a volumetric enclosure with opposed side panels, a top and a bottom panel, and a back and a front side, the power bay chassis being a separate physical component from other IT nodes within the rack, the power bay chassis further comprising, within the volumetric enclosure, a plurality of power supply units that electrically connects to an alternating current (AC) switch to receive AC power, a power controller, and a power distribution unit (PDU) having a positive distribution conductor and a negative distribution conductor directed toward a rear of the rack assembly, the power distribution unit electrically connected to the one or more PSUs to receive direct current (DC) electrical power; and
a first modular busbar assembly attached to the rear of the rack assembly, the first modular busbar assembly comprising a power busbar assembly and a ground busbar assembly, each of the power and ground busbar assemblies comprising:
one or more block busbars lengthwise attached to span a corresponding one or more IT nodes inserted into the rack assembly into electrical connection with the first modular busbar assembly;
a connecting busbar attached between the positive distribution conductor and the negative distribution conductor of the power distribution unit and the power busbar assembly and ground busbar assembly, respectively to provide electrical power via the one or more block busbars to the one or more IT nodes; and
one or more additional block busbars lengthwise attached to the one or more block busbars to extend vertically across and span a corresponding one or more additional IT nodes inserted into the rack assembly.

20. The rack-based IHS of claim 19, wherein:
the rack assembly comprises a first frame assembly and a second frame assembly placed on top thereof to provide physical support to an expansion zone of one or more additional IT nodes; and
wherein the one or more additional block busbars are lengthwise attached to span the expansion zone of the second frame assembly;
the first modular busbar assembly further comprising:
a top-of-rack connecting bar attached between the one or more block busbars and the one or more additional block busbars to provide electrical power to the one or more additional IT nodes.

21. The rack-based IHS of claim 19, wherein a connection between a selected block busbar and one of a connecting busbar and another block busbar comprises an overlapping area of at least 20 cm$^2$ with a respective thickness of each of the selected block busbar and the one of the connecting busbar and another block busbar being at least 8mm at the overlapping area.

22. The rack-based IHS of claim 19, wherein the rack assembly comprises a second modular busbar assembly, the power busbar assemblies and the ground busbar assemblies of the first and second modular busbar assemblies respectively electrically connected and comprising a flexible thickness of up to and including 4 mm.

23. A method for assembling a modular busbar assembly for a rack-based information handling system (IHS), the method comprising:
assembling a rack assembly having a modular structure that supports insertion from a front of the rack of different numbers and sizes of information technology (IT) gear to create one or more IT nodes, the rack vertically provisioned into an upper standard zone, a switch zone, and a lower standard zone, the switch zone designed with at least one switch bay and at least one power bay, each of the at least one switch bay and the at least one power bay configured to enable insertion of a fill-width chassis, the upper standard zone and the lower standard zone each divided into tiers by shelves, the shelves including full-width shelfs providing full-width IT bays for insertion of full-width IT nodes and shelves including partitions defining partial-width bays for insertion of multiple side-by-side partial-width IT nodes;

providing a power bay chassis having an exterior casing and configured as a full width IT node for insertion into one of the at least one power bay chassis of the switch zone, the exterior casing presenting a volumetric enclosure with opposed side panels, a top and a bottom panel, and a back and a front side, the power bay chassis being a separate physical component from other IT nodes within the rack, the power bay chassis further comprising, within the volumetric enclosure, a plurality of power supply units (PSUs) that electrically connect to an alternating current (AC) switch to receive AC power, a power controller, and a power distribution unit (PDU) having a positive distribution conductor and a negative distribution conductor directed toward a rear of the rack assembly, the PDU electrically connected to the plurality of PSUs to receive direct current (DC) electrical power; and attaching a first modular busbar assembly to the rear of the rack assembly, the first modular busbar assembly comprising:
- a power busbar assembly and a ground busbar assembly, each of the power and ground busbar assemblies comprising one or more block busbars lengthwise attached to span a corresponding one or more IT nodes inserted into the rack assembly into electrical connection with the first modular busbar assembly;
- a connecting busbar attached between the positive distribution conductor and the negative distribution conductor of the power distribution unit and the power busbar assembly and ground busbar assembly, respectively to provide electrical power via the one or more block busbars to the one or more IT nodes; and
- one or more additional block busbars attached lengthwise to the one or more busbars to extend vertically across and span a corresponding one or more additional IT nodes.

24. The method of claim 23, wherein:

assembling the rack assembly further comprises assembling a first frame assembly and a second frame assembly placed on top thereof to provide physical support to an expansion zone of one or more additional IT nodes; and assembling the first modular busbar assembly further comprising:
- attaching the one or more additional block busbars lengthwise to span a corresponding one or more additional IT nodes that are inserted into the expansion zone of the second frame assembly; and
- attaching a top-of-rack connecting bar between the one or more block busbars and the one or more additional block busbars to provide electrical power to the one or more additional IT nodes.

25. The method of claim 23, further comprising forming a connection between a selected block busbar and one of a connecting busbar and another block busbar the connection comprising an overlapping area of at least 20 cm$^2$ with a respective thickness of each of the selected block busbar and the one of the connecting busbar and another block busbar being at least 8 mm at the overlapping area.

26. The method of claim 23, further comprising:

assembling a second modular busbar assembly; and electrically connecting the power busbar assemblies and the ground busbar assemblies of the first and second modular busbar assemblies respectively;

wherein the first and second modular busbar assemblies comprise a flexible thickness of up to and including 4 mm.

* * * * *